US011177639B1

(12) United States Patent
Nguyen et al.

(10) Patent No.: US 11,177,639 B1
(45) Date of Patent: Nov. 16, 2021

(54) ELECTRICAL CABLE PASSTHROUGH FOR PHOTOVOLTAIC SYSTEMS

(71) Applicant: GAF Energy LLC, Parsippany, NJ (US)

(72) Inventors: Thierry Nguyen, San Francisco, CA (US); Evan Wray, Cotati, CA (US); Duncan Cleminshaw, Alameda, CA (US); Ryan Lemon Devine, Richmond, CA (US); Jonathan Hewlett, Novato, CA (US); Brian Edward Atchley, Petaluma, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 17/177,816

(22) Filed: Feb. 17, 2021

Related U.S. Application Data

(60) Provisional application No. 63/024,161, filed on May 13, 2020.

(51) Int. Cl.
*H02G 3/22* (2006.01)
*H01R 13/514* (2006.01)
*H02G 15/013* (2006.01)

(52) U.S. Cl.
CPC .............. *H02G 3/22* (2013.01); *H01R 13/514* (2013.01); *H02G 15/013* (2013.01)

(58) Field of Classification Search
None
See application file for complete search history.

(56) References Cited

U.S. PATENT DOCUMENTS

| 796,269 | A | * | 8/1905 | Vibber | ...................... H02G 3/22 |
| | | | | | 174/81 |
| 1,795,232 | A | * | 3/1931 | Wilhelm | ................... H02G 3/22 |
| | | | | | 174/491 |
| 2,703,688 | A | * | 3/1955 | Shuter | ...................... F16B 2/065 |
| | | | | | 248/72 |
| 2,877,031 | A | * | 3/1959 | Edwin | ................... H01B 17/305 |
| | | | | | 403/291 |
| 3,156,491 | A | * | 11/1964 | Reed | ..................... H02G 15/013 |
| | | | | | 285/243 |
| 3,173,734 | A | * | 3/1965 | Hartwell | ............... H01R 13/518 |
| | | | | | 439/291 |

(Continued)

FOREIGN PATENT DOCUMENTS

| CA | 2112159 | A1 | * | 6/1995 | ............... H02G 3/22 |
| DE | 3440512 | A1 | * | 4/1986 | ................ F16L 5/10 |

(Continued)

*Primary Examiner* — Timothy J. Dole
*Assistant Examiner* — Muhammed Azam
(74) *Attorney, Agent, or Firm* — Greenberg Traurig, LLP

(57) ABSTRACT

A cable passthrough includes a first layer having a first edge and an aperture, and a second layer overlapping the first layer. The passthrough is configured to be installed on a roof deck, such that the aperture is configured to align with an aperture formed within the roof deck. The passthrough is configured to receive at least one cable having a first end and a second end. The second end of the cable is capable of extending outwardly from the first edge of the first layer and the first edge of the second layer of the passthrough. The cable is configured to be positioned intermediate the first layer and the second layer.

20 Claims, 16 Drawing Sheets

(56) References Cited

U.S. PATENT DOCUMENTS

| | | | |
|---|---|---|---|
| 4,263,682 A * | 4/1981 | Bejarano | A61F 2/12 623/8 |
| 4,289,288 A * | 9/1981 | Gransberry | H02G 3/22 174/153 G |
| 4,548,853 A * | 10/1985 | Bryan | F16L 5/04 428/131 |
| 4,603,369 A * | 7/1986 | Freshman, Jr. | H02G 3/081 174/78 |
| 4,692,561 A * | 9/1987 | Nattel | H02G 15/013 174/653 |
| 5,349,790 A * | 9/1994 | Beetles | E04D 13/1407 52/19 |
| 5,378,166 A * | 1/1995 | Gallagher, Sr. | H01R 13/518 439/214 |
| 5,442,140 A * | 8/1995 | Mc Grane | F16L 5/10 174/151 |
| 5,562,295 A * | 10/1996 | Wambeke | H02G 15/076 277/605 |
| 6,008,450 A | 12/1999 | Ohtsuka et al. | |
| 6,013,875 A * | 1/2000 | Fridenberg | H02G 3/22 174/135 |
| 6,107,574 A * | 8/2000 | Chang | B29C 44/12 174/77 R |
| 6,341,454 B1 | 1/2002 | Koleoglou | |
| 6,361,054 B1 * | 3/2002 | Denker | B29C 33/0038 277/630 |
| 6,576,830 B2 * | 6/2003 | Nagao | H02S 20/23 136/244 |
| 6,578,800 B2 * | 6/2003 | Stefan | B25J 19/0025 248/52 |
| 6,858,791 B2 * | 2/2005 | Erban | H01L 31/02021 136/244 |
| 7,138,578 B2 * | 11/2006 | Komamine | H02S 20/25 136/251 |
| 7,155,870 B2 | 1/2007 | Almy | |
| 7,487,771 B1 * | 2/2009 | Eiffert | H02S 20/23 126/622 |
| 7,587,864 B2 * | 9/2009 | McCaskill | H02S 20/25 52/173.3 |
| 7,642,449 B2 * | 1/2010 | Korman | E04D 3/38 136/244 |
| 7,658,055 B1 * | 2/2010 | Adriani | B65B 23/20 53/475 |
| 7,678,990 B2 | 3/2010 | McCaskill et al. | |
| 7,678,991 B2 | 3/2010 | McCaskill et al. | |
| 7,819,114 B2 | 10/2010 | Augenbraun et al. | |
| 7,824,191 B1 | 11/2010 | Browder | |
| 7,832,176 B2 | 11/2010 | McCaskill et al. | |
| 8,210,570 B1 | 7/2012 | Railkar et al. | |
| 8,307,590 B2 * | 11/2012 | Smith | E04D 13/1407 52/198 |
| 8,468,754 B2 | 6/2013 | Railkar et al. | |
| 8,505,249 B2 | 8/2013 | Geary | |
| 8,695,291 B2 * | 4/2014 | Pisklak | H02S 40/36 52/173.3 |
| 8,713,860 B2 | 5/2014 | Railkar et al. | |
| 8,925,262 B2 | 1/2015 | Railkar et al. | |
| 8,946,544 B2 * | 2/2015 | Jacobs | H02S 20/23 136/252 |
| 8,994,224 B2 * | 3/2015 | Mehta | H02J 50/12 307/104 |
| 9,057,862 B2 * | 6/2015 | Strasser | G02B 6/4472 |
| 9,093,582 B2 * | 7/2015 | Hamilton | H01L 31/042 |
| 9,169,646 B2 | 10/2015 | Rodrigues et al. | |
| 9,273,885 B2 | 3/2016 | Rodrigues et al. | |
| 9,359,014 B1 | 6/2016 | Yang et al. | |
| 9,692,193 B1 * | 6/2017 | Schnorr | H02G 3/083 |
| 9,912,284 B2 | 3/2018 | Svec | |
| 9,923,515 B2 | 3/2018 | Rodrigues et al. | |
| 9,991,412 B2 | 6/2018 | Gonzalez et al. | |
| 10,027,273 B2 | 7/2018 | West et al. | |
| 10,115,850 B2 | 10/2018 | Rodrigues et al. | |
| 10,187,005 B2 | 1/2019 | Rodrigues et al. | |
| 10,256,765 B2 | 4/2019 | Rodrigues et al. | |
| 10,530,292 B1 | 1/2020 | Cropper et al. | |
| 10,601,362 B2 * | 3/2020 | Stephan | F16B 5/0225 |
| 2003/0217768 A1 | 11/2003 | Guha | |
| 2004/0011354 A1 * | 1/2004 | Erling | F24S 80/70 126/621 |
| 2005/0061360 A1 * | 3/2005 | Horioka | H02S 40/34 136/244 |
| 2005/0072593 A1 * | 4/2005 | Teng | H02G 3/22 174/100 |
| 2005/0109523 A1 * | 5/2005 | Snyder | H02G 3/22 174/483 |
| 2005/0178430 A1 * | 8/2005 | McCaskill | E04D 1/29 136/251 |
| 2006/0042683 A1 | 3/2006 | Gangemi | |
| 2006/0266406 A1 * | 11/2006 | Faust | H01L 31/048 136/244 |
| 2008/0194154 A1 * | 8/2008 | Minnick | H02S 40/34 439/842 |
| 2009/0057005 A1 * | 3/2009 | Groeller | H02G 3/22 174/481 |
| 2009/0114261 A1 | 5/2009 | Stancel et al. | |
| 2009/0126942 A1 * | 5/2009 | Kimiadi | H02G 3/22 166/378 |
| 2010/0101634 A1 | 4/2010 | Frank et al. | |
| 2010/0181088 A1 * | 7/2010 | Stolt | H02G 3/22 174/15.3 |
| 2010/0270967 A1 * | 10/2010 | Cho | H01M 10/46 320/101 |
| 2011/0048507 A1 | 3/2011 | Livsey et al. | |
| 2011/0132427 A1 | 6/2011 | Kalkanoglu et al. | |
| 2011/0194277 A1 * | 8/2011 | Yamaguchi | H02J 7/34 362/183 |
| 2011/0297442 A1 * | 12/2011 | Sulzer | F16L 5/10 174/88 R |
| 2012/0060902 A1 | 3/2012 | Drake | |
| 2012/0176077 A1 | 7/2012 | Oh et al. | |
| 2012/0279150 A1 * | 11/2012 | Pisklak | H01L 31/05 52/173.3 |
| 2012/0325548 A1 * | 12/2012 | Martinson | H02G 3/088 174/652 |
| 2013/0177458 A1 * | 7/2013 | Ying | F04D 13/0693 417/410.1 |
| 2013/0206939 A1 * | 8/2013 | Kuhn | F16M 13/02 248/231.9 |
| 2014/0182928 A1 * | 7/2014 | Starke | H02G 3/22 174/559 |
| 2014/0259974 A1 * | 9/2014 | Gilleran | H02G 15/013 52/62 |
| 2014/0284098 A1 * | 9/2014 | Yamanaka | H01L 31/05 174/650 |
| 2015/0023822 A1 * | 1/2015 | Majors | H02G 3/0675 417/423.3 |
| 2015/0040965 A1 * | 2/2015 | West | F24S 25/63 136/246 |
| 2015/0152980 A1 * | 6/2015 | Okura | F16L 3/1083 248/74.2 |
| 2015/0155079 A1 * | 6/2015 | Martins Neto | H01B 17/586 174/153 R |
| 2015/0155823 A1 * | 6/2015 | West | H02S 20/23 248/346.04 |
| 2015/0244158 A1 * | 8/2015 | Fukuoka | H02G 3/22 218/139 |
| 2015/0318680 A1 * | 11/2015 | Solak | H02G 15/013 174/650 |
| 2016/0040809 A1 * | 2/2016 | Bertler | B29C 66/532 285/320 |
| 2016/0141846 A1 * | 5/2016 | Atchley | H02B 13/005 361/605 |
| 2016/0248368 A1 * | 8/2016 | Seery | H02S 20/23 |
| 2016/0268790 A1 * | 9/2016 | Panfil | H01Q 1/3275 |
| 2016/0308489 A1 * | 10/2016 | Hudson | H02S 40/36 |
| 2016/0359451 A1 | 12/2016 | Mao et al. | |
| 2017/0159292 A1 | 6/2017 | Chihlas et al. | |
| 2017/0317433 A1 * | 11/2017 | Merrill | H02G 3/0406 |
| 2018/0116062 A1 * | 4/2018 | Maeshiba | F04B 23/00 |
| 2018/0128400 A1 * | 5/2018 | Twelves | H02G 3/22 |

(56) References Cited

U.S. PATENT DOCUMENTS

| | | | |
|---|---|---|---|
| 2018/0163900 A1* | 6/2018 | Vaughn | F16L 5/00 |
| 2018/0191290 A1* | 7/2018 | Guthrie | H01L 31/048 |
| 2018/0248306 A1* | 8/2018 | Franke | H02G 15/013 |
| 2019/0081436 A1* | 3/2019 | Onodi | H01R 13/5213 |
| 2019/0115743 A1* | 4/2019 | Portillo Gallego | H02G 3/0641 |
| 2019/0123540 A1* | 4/2019 | Nakamura | H02G 3/088 |
| 2019/0140430 A1* | 5/2019 | Waitkus | F01D 25/00 |
| 2019/0257051 A1* | 8/2019 | Dallinger | E02D 27/525 |
| 2019/0360612 A1* | 11/2019 | DeCosta | H02G 3/386 |
| 2019/0372517 A1* | 12/2019 | Pao | H02G 3/081 |
| 2019/0393690 A1* | 12/2019 | Coscarella | E04F 13/0869 |
| 2020/0052472 A1* | 2/2020 | Goto | H02G 15/013 |
| 2020/0083634 A1* | 3/2020 | Ito | H01R 4/4827 |
| 2020/0115907 A1* | 4/2020 | Agam | E04D 13/1476 |
| 2020/0144958 A1 | 5/2020 | Rodrigues et al. | |

FOREIGN PATENT DOCUMENTS

| | | | | |
|---|---|---|---|---|
| DE | 3732486 A1 * | 4/1989 | | H02G 9/10 |
| DE | 29509193 U1 * | 8/1995 | | H02G 3/22 |
| DE | 10342082 A1 * | 4/2005 | | H02G 3/22 |
| DE | 102005057870 B3 * | 5/2007 | | B60R 16/0222 |
| DE | 102015114289 A1 * | 3/2017 | | H02G 15/013 |
| DE | 202016105271 U1 * | 12/2017 | | B60R 16/0222 |
| EP | 2003757 A1 * | 12/2008 | | H02G 15/013 |
| EP | 2868345 A1 * | 5/2015 | | A61N 1/3752 |
| EP | 3208507 B1 * | 5/2020 | | F16L 5/04 |
| EP | 3719945 A1 * | 10/2020 | | H02G 3/22 |
| FR | 2877779 A1 * | 5/2006 | | H02G 3/22 |
| FR | 2977395 A1 * | 1/2013 | | H01L 31/02008 |
| FR | 3085238 A1 * | 2/2020 | | F16J 15/168 |
| GB | 338332 A * | 11/1930 | | H02G 3/22 |
| JP | 2001-098703 A | 4/2001 | | |
| JP | 2014220076 A * | 11/2014 | | H02G 3/22 |
| JP | 2018-053707 A | 4/2018 | | |
| WO | WO-2008153485 A1 * | 12/2008 | | H02G 3/22 |
| WO | WO-2011121829 A1 * | 10/2011 | | H02G 3/22 |
| WO | WO-2013094355 A1 * | 6/2013 | | E04D 13/00 |
| WO | WO-2014126821 A1 * | 8/2014 | | H02G 3/00 |
| WO | 2015/133632 A1 | 9/2015 | | |
| WO | WO-2016006017 A1 * | 1/2016 | | H02G 15/013 |

* cited by examiner

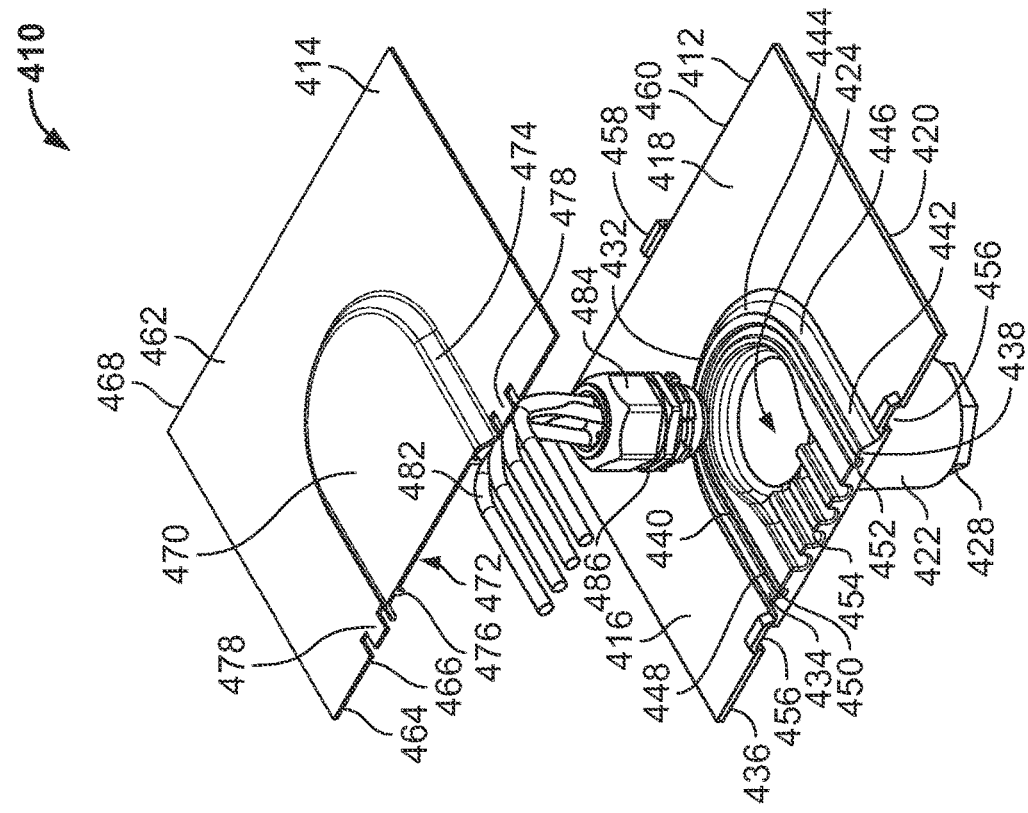

ELECTRICAL CABLE PASSTHROUGH FOR PHOTOVOLTAIC SYSTEMS

CROSS-REFERENCE TO RELATED APPLICATION

This application is a Section 111(a) application relating to and claiming the benefit of commonly-owned, co-pending U.S. Provisional Patent Application Ser. No. 63/024,161, filed May 13, 2020, entitled "ELECTRICAL CABLE PASSTHROUGH," the contents of which is incorporated herein by reference in its entirety.

FIELD OF THE INVENTION

The present invention relates to passthrough devices and, more particularly, passthrough devices for electrical cables.

BACKGROUND OF THE INVENTION

Photovoltaic systems having solar panels are commonly installed on roofing of structures. What is needed is an efficient electrical cable passthrough configured for use with photovoltaic systems installed on roof decks.

SUMMARY OF THE INVENTION

In an embodiment, a system includes a passthrough including a first layer having a first edge and an aperture, and a second layer overlapping the first layer, the second layer including a first edge substantially aligned with the first edge of the first layer, wherein the passthrough is configured to be installed on a roof deck, and wherein the aperture is configured to align with an aperture formed within the roof deck; and at least one cable having a first end and a second end opposite the first end, wherein the aperture of the first layer of the passthrough is sized and shaped to receive the first end of the at least one cable, wherein the second end of the at least one cable extends outwardly from the first edge of the first layer and the first edge of the second layer of the passthrough, and wherein the second end of the at least one cable is positioned intermediate the first layer and the second layer of the passthrough.

In an embodiment, the first layer includes a second edge opposite the first edge of the first layer, and the second layer includes a second edge opposite the first edge of the second layer, and wherein the second layer is attached to the first layer intermediate the first edge of the first layer and the second edge of the first layer. In an embodiment, the first layer includes a third edge extending between the first edge of the first layer and the second edge of the first layer, and the second layer includes a third edge extending between the first edge of the second layer and the second edge of the second layer, and wherein the second layer is attached to the first layer proximate to the third edge of the first layer. In an embodiment, the first layer includes a fourth edge extending between the first edge of the first layer and the second edge of the first layer, and the second layer includes a fourth edge extending between the first edge of the second layer and the second edge of the second layer, and wherein the second layer is attached to the first layer proximate to the fourth edge of the first layer.

In an embodiment, the passthrough includes a pocket having a perimeter defined by an area of attachment of the second layer to the first layer. In an embodiment, each of the first layer and the second layer of the passthrough is made from a polymer. In an embodiment, each of the first layer and the second layer of the passthrough includes thermoplastic polyolefin (TPO). In an embodiment, the passthrough is affixed to the roof deck by a plurality of fasteners.

In an embodiment, the first layer of the passthrough is affixed to the roof deck by a plurality of fasteners, and wherein the plurality of fasteners is located intermediate a perimeter of the pocket and the first, second, third and fourth edges of the first layer. In an embodiment, the passthrough is affixed to the roof deck by an adhesive. In an embodiment, the passthrough includes a base plate having a base with first surface and a second surface opposite the first surface, and a tubular member extending from the second surface, and wherein the tubular member is sized and shaped to be positioned through the aperture of the passthrough and the aperture of the roof deck.

In an embodiment, the base of the base plate is configured to be positioned substantially flush with the roof deck. In an embodiment, a thickness of the base of the base plate is in a range of 0.5 mm to 5 mm. In an embodiment, the system further includes a cable gland installed within the tubular member of the base plate. In an embodiment, the cable gland includes a body having a first end and a second end opposite the first end of the body of the cable gland, and a sealing nut located at the first end of the body, wherein the sealing nut is sized and shaped to be positioned within the tubular member of the base plate.

In an embodiment, the system further includes a raceway attached to the second end of the body of the cable gland. In an embodiment, the passthrough is configured to receive the least one cable having a bend with a bend radius in a range of 10 mm to 20 mm. In an embodiment, the cable gland includes a socket wherein the socket includes a first surface, a second surface opposite the first surface of the socket, at least one first receptacle within the first surface of the socket, and at least one second receptacle within the second surface of the socket and in communication with a corresponding one of the at least one first receptacle, wherein the at least one first receptacle is configured to receive a connector of the at least one cable, and the at least one second receptacle is configured to receive a connector of at least one of a second cable. In an embodiment, the at least one cable includes a flat wire, and at least one of a second cable includes a round wire.

In an embodiment, the cable passthrough includes a first layer having a first edge and an aperture; a second layer overlapping the first layer, the second layer including a first edge substantially aligned with the first edge of the first layer, wherein the passthrough is configured to be installed on a roof deck, and wherein the aperture is configured to align with an aperture formed within the roof deck, wherein the passthrough is configured to receive at least one cable having a first end and a second end opposite the first end, wherein the aperture of the first layer of the passthrough is sized and shaped to receive the first end of the at least one cable, wherein the second end of the at least one cable is capable of extending outwardly from the first edge of the first layer and the first edge of the second layer of the passthrough, and wherein the second end of the at least one cable is configured to be positioned intermediate the first layer and the second layer of the passthrough.

BRIEF DESCRIPTION OF THE DRAWINGS

FIGS. 15 and 16 show a top perspective view and an exploded perspective view, respectively, of an embodiment of an electrical cable passthrough;

DETAILED DESCRIPTION

Figure 1:
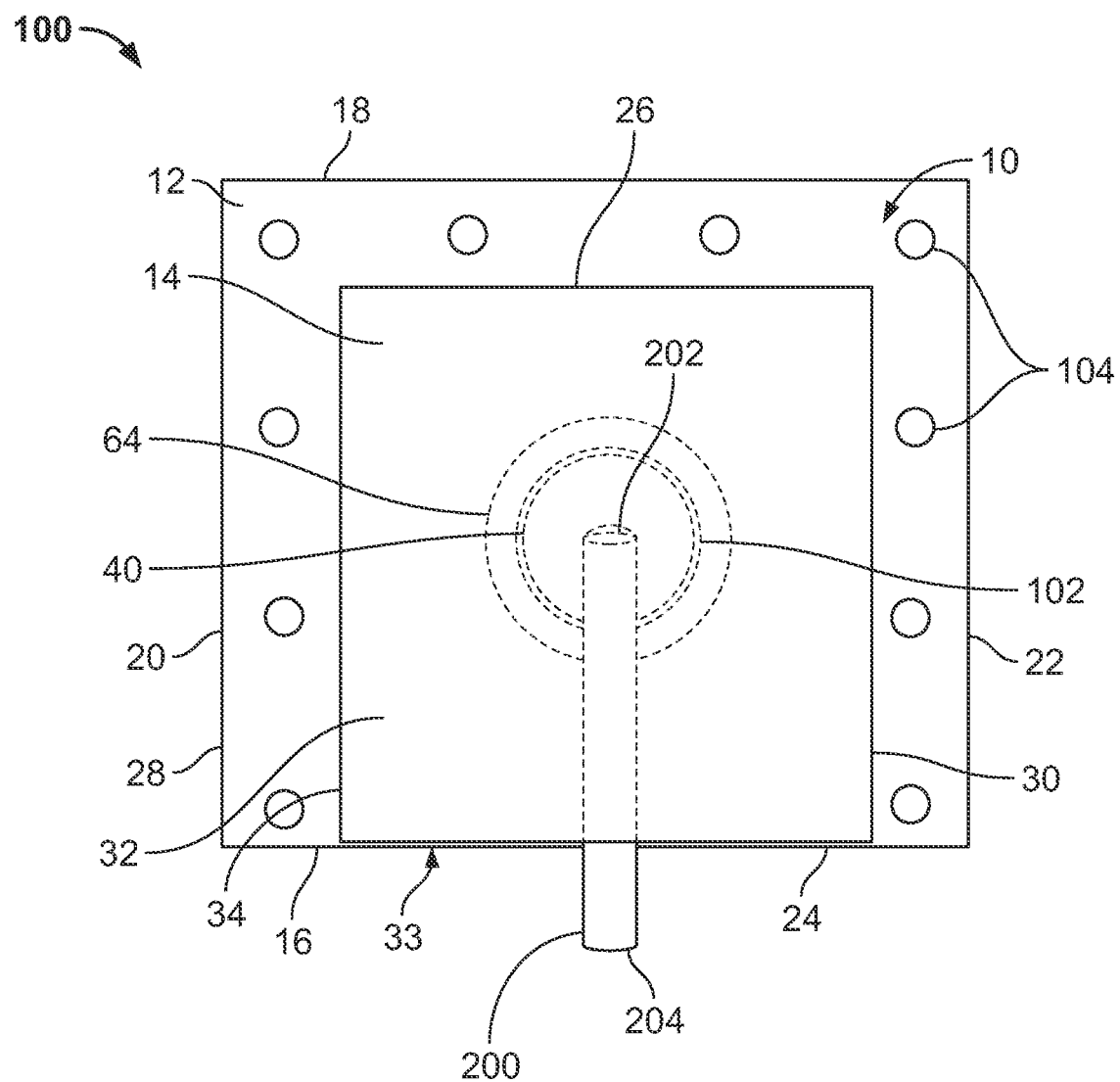
FIG. 1 is a schematic top plan view of an embodiment of an electrical cable passthrough.
Figure 2A:
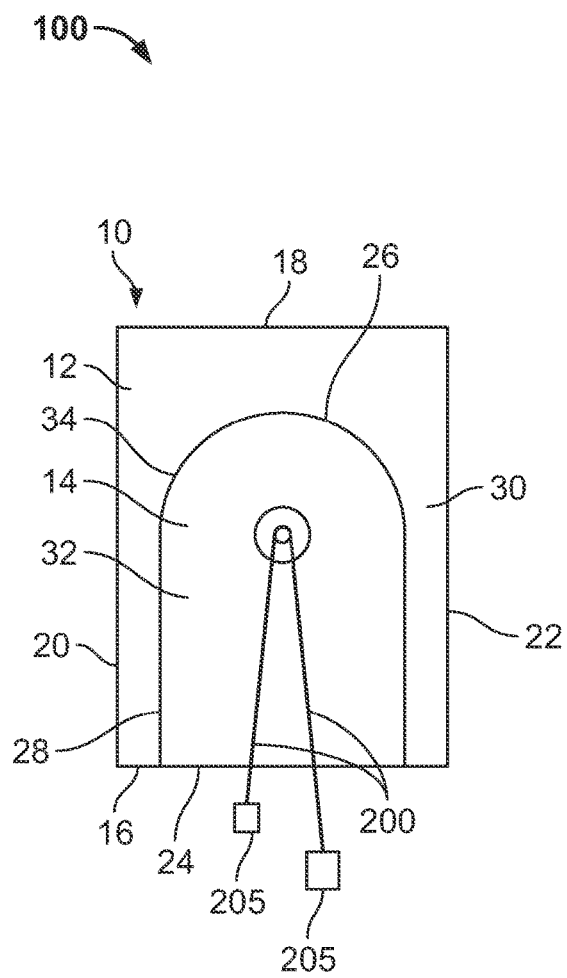
FIGS. 2A and 2B are schematic views of the electrical cable passthrough of FIG. 1.
Figure 2B:
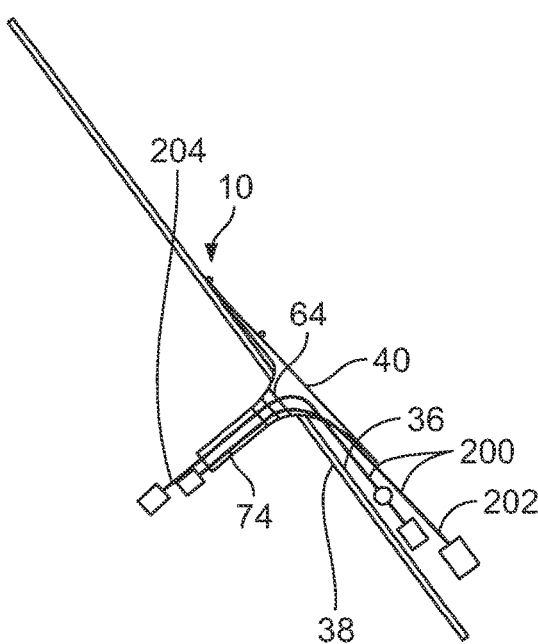
Figure 3:
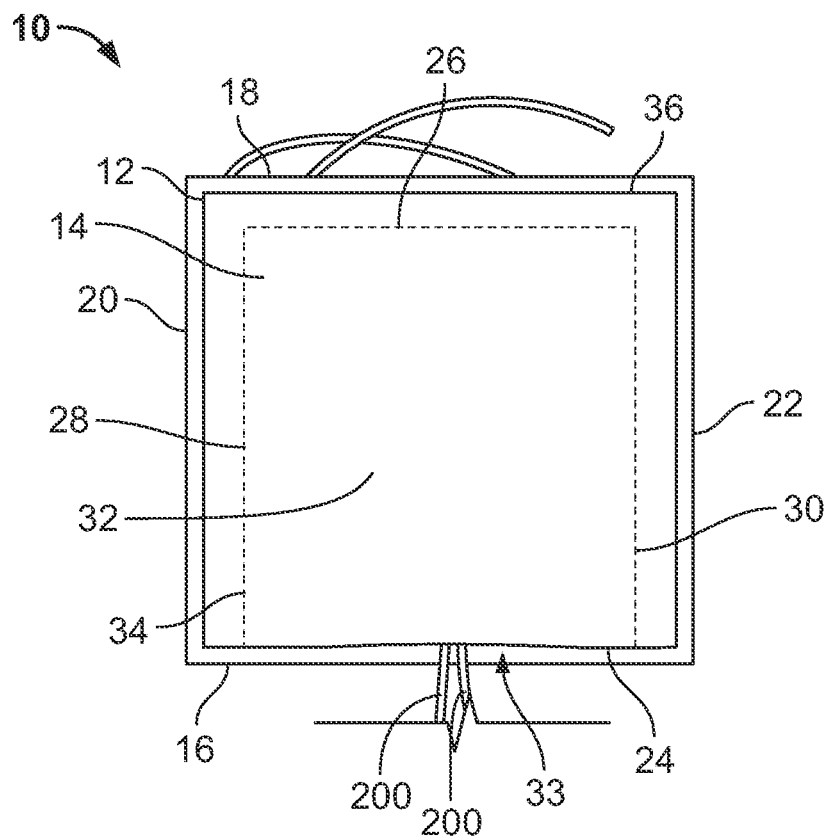
FIG. 3 is a photo of top plan view of the electrical cable passthrough of FIG. 1.
Figure 4:
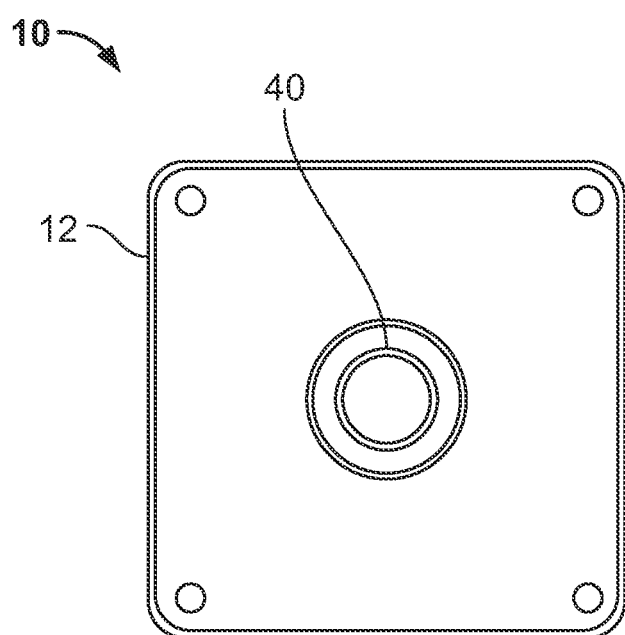
FIG. 4 is a photo of a bottom plan view of the electrical cable passthrough shown in FIG. 3.
Figure 5:
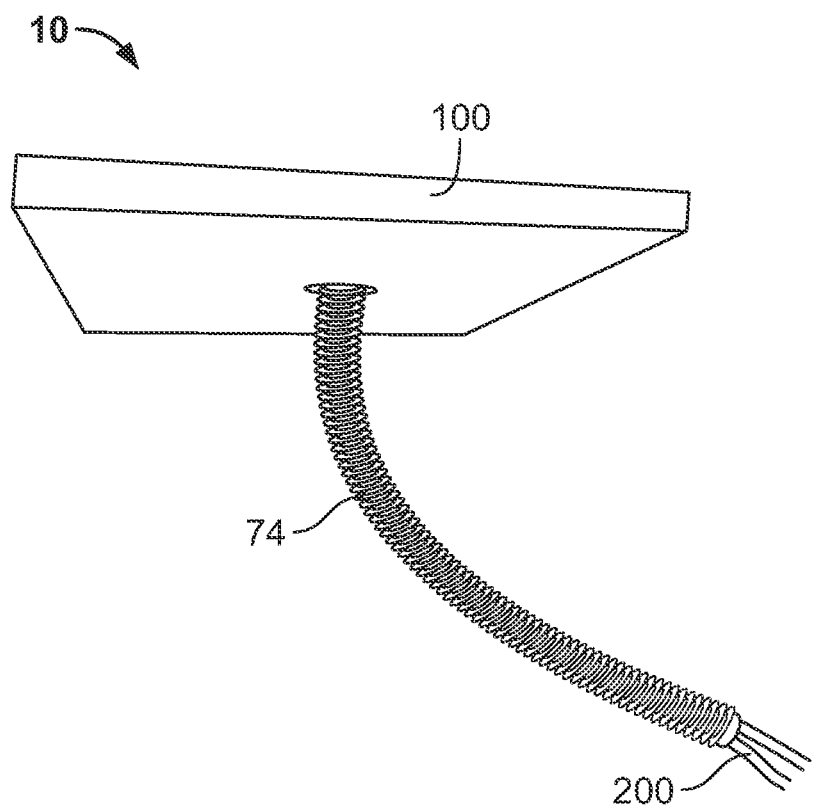
FIG. 5 is a photo of a bottom perspective view of the electrical cable passthrough shown in FIG. 4 with a raceway connected to the passthrough.
Figure 6:
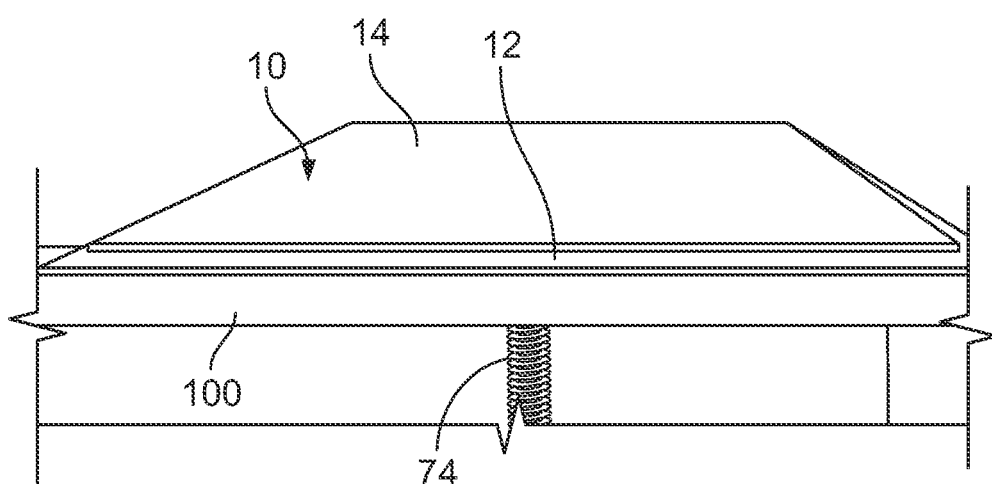
FIG. 6 is a photo of a side elevational view of the electrical cable passthrough shown in FIG. 5.

Referring to FIGS. 1 through 6, in an embodiment, an electrical cable passthrough 10 (hereinafter "passthrough 10") includes a first layer 12 and a second layer 14. In an embodiment, the second layer 14 overlaps the first layer 12. In an embodiment, the first layer 12 includes a first edge 16, a second edge 18 opposite the first edge 16, a third edge 20 extending between the first edge 16 and the second edge 18, and a fourth edge 22 extending between the first edge 16 and the second edge 18 and opposite the third edge 20. In an embodiment, the second layer 14 includes a first edge 24, a second edge 26 opposite the first edge 24, a third edge 28 extending between the first edge 24 and the second edge 26, and a fourth edge 30 extending between the first edge 24 and the second edge 26 and opposite the third edge 28. In an embodiment, each or any of the first, second, third and fourth edges 16, 18, 20, 22 of the first layer 12 includes a linear edge. In an embodiment, each or any of the first, second, third and fourth edges 24, 26, 28, 30 of the second layer 14 includes a linear edge. In another embodiment, each or any of the first, second, third, and fourth edges 16, 18, 20, 22 of the first layer 12 includes a curvilinear edge. In another embodiment, each or any of the first, second, third and fourth edges 24, 26, 28, 30 of the second layer 14 includes a curvilinear edge. In an embodiment, each or either of the first and second layers 12, 14 is square in shape. In another embodiment, each or either of the first and second layers 12, 14 is rectangular in shape.

In an embodiment, the first edge 24 of the second layer 14 is substantially aligned with the first edge 16 of the first layer 12. In another embodiment, the first edge 24 of the second layer 14 is aligned with the first edge 16 of the first layer 12. In an embodiment, the second layer 14 is attached to the first layer 12 intermediate the first edge 16 of the first layer 12 and the second edge 18 of the first layer 12. In an embodiment, the second layer 14 is attached to the first layer 12 proximate to the second edge 18 of the first layer 12. In an embodiment, the second layer 14 is attached to the first layer 12 proximate to the third edge 20 of the first layer 12. In an embodiment, the second layer 14 is attached to the first layer 12 proximate to the fourth edge 22 of the first layer 12. In an embodiment, the passthrough 10 includes a pocket 32 having a perimeter 34 defined by an area of attachment of the second layer 14 to the first layer 12. In an embodiment, the pocket 32 includes an opening 33 formed by the first edge 16 of the first layer 12 and the second edge 26 of the second layer 14. In an embodiment, the first layer 12 includes a first surface 36, a second surface 38 opposite the first surface 36, and an aperture 40 extending from the first surface 36 to the second surface 38.

In an embodiment, the first layer 12 is made from a polymer. In an embodiment, the second layer 14 is made from a polymer. In an embodiment, the first layer 12 includes thermoplastic polyolefin (TPO). In an embodiment, the second layer 14 includes thermoplastic polyolefin (TPO). In other embodiments, the first layer 12 and the second layer 14 are made of polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide.

In another embodiment, the first layer 12 and the second layer 14 are made from polyvinyl chloride (PVC). In another embodiment, the first layer 12 and the second layer 14 are made from ethylene propylene diene monomer (EPDM) rubber. In another embodiment, the first layer 12 and the second layer 14 are made from silicone rubber. In another embodiment, the first layer 12 and the second layer 14 are made from a fluoropolymer. In certain embodiments, the fluoropolymer may be ethylene tetrafluoroethylene (ETFE), polyvinylidene fluoride (PVDF), tetrafluoroethylene-hexafluoropropylene copolymers (FEP), and tetrafluoroethylene-hexafluoropropylene-vinylidene fluoride copolymers (THV), or blends thereof.

In another embodiment, the first layer 12 is made of metal. In an embodiment, the second layer 14 is made of metal. In an embodiment, the first layer 12 and the second layer 14 are made from aluminum. In another embodiment, the first layer 12 and the second layer 14 are made from weldable aluminum.

In an embodiment, a flexibility of each of the first layer 12 and the second layer 14 conforms to standards under ASTM D6878-17, Section 7.9 test standards. In an embodiment, each of the first and second layers 12, 14 includes a hardness in a range of Shore 70A to Shore 100A. In another embodiment, each of the first and second layers 12, 14 includes a hardness in a range of Shore 70A to Shore 95A. In another embodiment, each of the first and second layers 12, 14 includes a hardness in a range of Shore 70A to Shore 90A. In another embodiment, each of the first and second layers 12, 14 includes a hardness in a range of Shore 70A to Shore 85A. In another embodiment, each of the first and second layers 12, 14 includes a hardness in a range of Shore 70A to Shore 80A. In another embodiment, each of the first and second layers 12, 14 includes a hardness in a range of Shore 70A to Shore 75A. In another embodiment, each of the first and second layers 12, 14 includes a hardness in a range of Shore 75A to Shore 100A. In another embodiment, each of the first and second layers 12, 14 includes a hardness in a range of Shore 80A to Shore 100A. In another embodiment, each of the first and second layers 12, 14 includes a hardness in a range of Shore 85A to Shore 100A. In another embodiment, each of the first and second layers 12, 14 includes a hardness in a range of Shore 90A to Shore 100A. In another embodiment, each of the first and second layers 12, 14 includes a hardness in a range of Shore 95A to Shore 100A.

In another embodiment, each of the first and second layers 12, 14 includes a hardness in a range of Shore 75A to Shore 95A. In another embodiment, each of the first and second layers 12, 14 includes a hardness in a range of Shore 75A to Shore 90A. In another embodiment, each of the first and second layers 12, 14 includes a hardness in a range of Shore 75A to Shore 85A. In another embodiment, each of the first and second layers 12, 14 includes a hardness in a range of Shore 75A to Shore 80A. In another embodiment, each of the first and second layers 12, 14 includes a hardness in a range of Shore 80A to Shore 95A. In another embodiment, each of the first and second layers 12, 14 includes a hardness in a range of Shore 80A to Shore 90A. In another embodiment, each of the first and second layers 12, 14 includes a hardness in a range of Shore 80A to Shore 85A. In another embodiment, each of the first and second layers 12, 14 includes a hardness in a range of Shore 85A to Shore 95A. In another embodiment, each of the first and second layers 12, 14 includes a hardness in a range of Shore 85A to Shore 90A. In another embodiment, each of the first and second layers 12, 14 includes a hardness in a range of Shore 90A to Shore 95A.

In an embodiment, each of the first layer 12 and the second layer 14 includes a thickness in a range of 5 mil to 100 mil. In another embodiment, each of the first layer 12 and the second layer 14 includes a thickness in a range of 5 mil to 95 mil. In another embodiment, each of the first layer 12 and the second layer 14 includes a thickness in a range of 5 mil to 90 mil. In another embodiment, each of the first layer 12 and the second layer 14 includes a thickness in a range of 5 mil to 85 mil. In another embodiment, each of the first layer 12 and the second layer 14 includes a thickness in a range of 5 mil to 80 mil. In another embodiment, each of the first layer 12 and the second layer 14 includes a thickness in a range of 5 mil to 75 mil. In another embodiment, each of the first layer 12 and the second layer 14 includes a thickness in a range of 5 mil to 70 mil. In another embodiment, each of the first layer 12 and the second layer 14 includes a thickness in a range of 5 mil to 65 mil. In another embodiment, each of the first layer 12 and the second layer 14 includes a thickness in a range of 5 mil to 60 mil. In another embodiment, each of the first layer 12 and the second layer 14 includes a thickness in a range of 5 mil to 55 mil. In another embodiment, each of the first layer 12 and the second layer 14 includes a thickness in a range of 5 mil to 50 mil. In another embodiment, each of the first layer 12 and the second layer 14 includes a thickness in a range of 5 mil to 45 mil. In another embodiment, each of the first layer 12 and the second layer 14 includes a thickness in a range of 5 mil to 40 mil. In another embodiment, each of the first layer 12 and the second layer 14 includes a thickness in a range of 5 mil to 35 mil. In another embodiment, each of the first layer 12 and the second layer 14 includes a thickness in a range of 5 mil to 30 mil. In another embodiment, each of the first layer 12 and the second layer 14 includes a thickness in a range of 5 mil to 25 mil. In another embodiment, each of the first layer 12 and the second layer 14 includes a thickness in a range of 5 mil to 20 mil. In another embodiment, each of the first layer 12 and the second layer 14 includes a thickness in a range of 5 mil to 15 mil. In another embodiment, each of the first layer 12 and the second layer 14 includes a thickness in a range of 5 mil to 10 mil.

In another embodiment, each of the first layer 12 and the second layer 14 includes a thickness in a range of 10 mil to 100 mil. In another embodiment, each of the first layer 12 and the second layer 14 includes a thickness in a range of 15 mil to 100 mil. In another embodiment, each of the first layer 12 and the second layer 14 includes a thickness in a range of 20 mil to 100 mil. In another embodiment, each of the first layer 12 and the second layer 14 includes a thickness in a range of 25 mil to 100 mil. In another embodiment, each of the first layer 12 and the second layer 14 includes a thickness in a range of 30 mil to 100 mil. In another embodiment, each of the first layer 12 and the second layer 14 includes a thickness in a range of 35 mil to 100 mil. In another embodiment, each of the first layer 12 and the second layer 14 includes a thickness in a range of 40 mil to 100 mil. In another embodiment, each of the first layer 12 and the second layer 14 includes a thickness in a range of 45 mil to 100 mil. In another embodiment, each of the first layer 12 and the second layer 14 includes a thickness in a range of 50 mil to 100 mil. In another embodiment, each of the first layer 12 and the second layer 14 includes a thickness in a range of 55 mil to 100 mil. In another embodiment, each of the first layer 12 and the second layer 14 includes a thickness in a range of 60 mil to 100 mil. In another embodiment, each of the first layer 12 and the second layer 14 includes a thickness in a range of 65 mil to 100 mil. In another embodiment, each of the first layer 12 and the second layer 14 includes a thickness in a range of 70 mil to 100 mil. In another embodiment, each of the first layer 12 and the second layer 14 includes a thickness in a range of 75 mil to 100 mil. In another embodiment, each of the first layer 12 and the second layer 14 includes a thickness in a range of 80 mil to 100 mil. In another embodiment, each of the first layer 12 and the second layer 14 includes a thickness in a range of 85 mil to 100 mil. In another embodiment, each of the first layer 12 and the second layer 14 includes a thickness in a range of 90 mil to 100 mil. In another embodiment, each of the first layer 12 and the second layer 14 includes a thickness in a range of 95 mil to 100 mil.

In another embodiment, each of the first layer 12 and the second layer 14 includes a thickness in a range of 10 mil to 95 mil. In another embodiment, each of the first layer 12 and the second layer 14 includes a thickness in a range of 15 mil to 95 mil. In another embodiment, each of the first layer 12 and the second layer 14 includes a thickness in a range of 20 mil to 95 mil. In another embodiment, each of the first layer 12 and the second layer 14 includes a thickness in a range of 25 mil to 95 mil. In another embodiment, each of the first layer 12 and the second layer 14 includes a thickness in a range of 30 mil to 95 mil. In another embodiment, each of the first layer 12 and the second layer 14 includes a thickness in a range of 35 mil to 95 mil. In another embodiment, each of the first layer 12 and the second layer 14 includes a thickness in a range of 40 mil to 95 mil. In another embodiment, each of the first layer 12 and the second layer 14 includes a thickness in a range of 45 mil to 95 mil. In another embodiment, each of the first layer 12 and the second layer 14 includes a thickness in a range of 50 mil to 95 mil. In another embodiment, each of the first layer 12 and the second layer 14 includes a thickness in a range of 55 mil to 95 mil. In another embodiment, each of the first layer 12 and the second layer 14 includes a thickness in a range of 60 mil to 95 mil. In another embodiment, each of the first layer 12 and the second layer 14 includes a thickness in a range of 65 mil to 95 mil. In another embodiment, each of the first layer 12 and the second layer 14 includes a thickness in a range of 70 mil to 95 mil. In another embodiment, each of the first layer 12 and the second layer 14 includes a thickness in a range of 75 mil to 95 mil. In another embodiment, each of the first layer 12 and the second layer 14 includes a thickness in a range of 80 mil to 95 mil. In another embodiment, each of the first layer 12 and the second layer 14 includes a thickness in a range of 85 mil to 95 mil. In another embodiment, each of the first layer 12 and the second layer 14 includes a thickness in a range of 90 mil to 95 mil.

In another embodiment, each of the first layer 12 and the second layer 14 includes a thickness in a range of 15 mil to 90 mil. In another embodiment, each of the first layer 12 and the second layer 14 includes a thickness in a range of 20 mil to 90 mil. In another embodiment, each of the first layer 12 and the second layer 14 includes a thickness in a range of 25 mil to 90 mil. In another embodiment, each of the first layer 12 and the second layer 14 includes a thickness in a range of 30 mil to 90 mil. In another embodiment, each of the first layer 12 and the second layer 14 includes a thickness in a range of 35 mil to 90 mil. In another embodiment, each of the first layer 12 and the second layer 14 includes a thickness in a range of 40 mil to 90 mil. In another embodiment, each of the first layer 12 and the second layer 14 includes a thickness in a range of 45 mil to 90 mil. In another embodiment, each of the first layer 12 and the second layer 14 includes a thickness in a range of 50 mil to 90 mil. In another embodiment, each of the first layer 12 and the second layer 14 includes a thickness in a range of 55 mil to 90 mil. In another embodiment, each of the first layer 12 and the second layer 14 includes a thickness in a range of 60 mil to 90 mil. In another embodiment, each of the first layer 12 and the second layer 14 includes a thickness in a range of 65 mil to 90 mil. In another embodiment, each of the first layer 12 and the second layer 14 includes a thickness in a range of 70 mil to 90 mil. In another embodiment, each of the first layer 12 and the second layer 14 includes a thickness in a range of 75 mil to 90 mil. In another embodiment, each of the first layer 12 and the second layer 14 includes a thickness in a range of 80 mil to 90 mil. In another embodiment, each of the first layer 12 and the second layer 14 includes a thickness in a range of 85 mil to 90 mil.

In another embodiment, each of the first layer 12 and the second layer 14 includes a thickness in a range of 15 mil to 85 mil. In another embodiment, each of the first layer 12 and the second layer 14 includes a thickness in a range of 20 mil to 85 mil. In another embodiment, each of the first layer 12 and the second layer 14 includes a thickness in a range of 25 mil to 85 mil. In another embodiment, each of the first layer 12 and the second layer 14 includes a thickness in a range of 30 mil to 85 mil. In another embodiment, each of the first layer 12 and the second layer 14 includes a thickness in a range of 35 mil to 85 mil. In another embodiment, each of the first layer 12 and the second layer 14 includes a thickness in a range of 40 mil to 85 mil. In another embodiment, each of the first layer 12 and the second layer 14 includes a thickness in a range of 45 mil to 85 mil. In another embodiment, each of the first layer 12 and the second layer 14 includes a thickness in a range of 50 mil to 85 mil. In another embodiment, each of the first layer 12 and the second layer 14 includes a thickness in a range of 55 mil to 85 mil. In another embodiment, each of the first layer 12 and the second layer 14 includes a thickness in a range of 60 mil to 85 mil. In another embodiment, each of the first layer 12 and the second layer 14 includes a thickness in a range of 65 mil to 85 mil. In another embodiment, each of the first layer 12 and the second layer 14 includes a thickness in a range of 70 mil to 85 mil. In another embodiment, each of the first layer 12 and the second layer 14 includes a thickness in a range of 75 mil to 85 mil. In another embodiment, each of the first layer 12 and the second layer 14 includes a thickness in a range of 80 mil to 85 mil.

In another embodiment, each of the first layer 12 and the second layer 14 includes a thickness in a range of 20 mil to 80 mil. In another embodiment, each of the first layer 12 and the second layer 14 includes a thickness in a range of 25 mil to 80 mil. In another embodiment, each of the first layer 12 and the second layer 14 includes a thickness in a range of 30 mil to 80 mil. In another embodiment, each of the first layer 12 and the second layer 14 includes a thickness in a range of 35 mil to 80 mil. In another embodiment, each of the first layer 12 and the second layer 14 includes a thickness in a range of 40 mil to 80 mil. In another embodiment, each of the first layer 12 and the second layer 14 includes a thickness in a range of 45 mil to 80 mil. In another embodiment, each of the first layer 12 and the second layer 14 includes a thickness in a range of 50 mil to 80 mil. In another embodiment, each of the first layer 12 and the second layer 14 includes a thickness in a range of 55 mil to 80 mil. In another embodiment, each of the first layer 12 and the second layer 14 includes a thickness in a range of 60 mil to 80 mil. In another embodiment, each of the first layer 12 and the second layer 14 includes a thickness in a range of 65 mil to 80 mil. In another embodiment, each of the first layer 12 and the second layer 14 includes a thickness in a range of 70 mil to 80 mil. In another embodiment, each of the first layer 12 and the second layer 14 includes a thickness in a range of 75 mil to 80 mil.

In another embodiment, each of the first layer 12 and the second layer 14 includes a thickness in a range of 25 mil to 75 mil. In another embodiment, each of the first layer 12 and the second layer 14 includes a thickness in a range of 30 mil to 75 mil. In another embodiment, each of the first layer 12 and the second layer 14 includes a thickness in a range of 35 mil to 75 mil. In another embodiment, each of the first layer 12 and the second layer 14 includes a thickness in a range of 40 mil to 75 mil. In another embodiment, each of the first layer 12 and the second layer 14 includes a thickness in a range of 45 mil to 75 mil. In another embodiment, each of the first layer 12 and the second layer 14 includes a thickness in a range of 50 mil to 75 mil. In another embodiment, each of the first layer 12 and the second layer 14 includes a thickness in a range of 55 mil to 75 mil. In another embodiment, each of the first layer 12 and the second layer 14 includes a thickness in a range of 60 mil to 75 mil. In another embodiment, each of the first layer 12 and the second layer 14 includes a thickness in a range of 65 mil to 75 mil. In another embodiment, each of the first layer 12 and the second layer 14 includes a thickness in a range of 70 mil to 75 mil.

In another embodiment, each of the first layer 12 and the second layer 14 includes a thickness in a range of 30 mil to 70 mil. In another embodiment, each of the first layer 12 and the second layer 14 includes a thickness in a range of 35 mil to 70 mil. In another embodiment, each of the first layer 12 and the second layer 14 includes a thickness in a range of 40 mil to 70 mil. In another embodiment, each of the first layer 12 and the second layer 14 includes a thickness in a range of 45 mil to 70 mil. In another embodiment, each of the first layer 12 and the second layer 14 includes a thickness in a range of 50 mil to 70 mil. In another embodiment, each of the first layer 12 and the second layer 14 includes a thickness in a range of 55 mil to 70 mil. In another embodiment, each of the first layer 12 and the second layer 14 includes a thickness in a range of 60 mil to 70 mil. In another embodiment, each of the first layer 12 and the second layer 14 includes a thickness in a range of 65 mil to 70 mil.

In another embodiment, each of the first layer 12 and the second layer 14 includes a thickness in a range of 35 mil to 65 mil. In another embodiment, each of the first layer 12 and the second layer 14 includes a thickness in a range of 40 mil to 65 mil. In another embodiment, each of the first layer 12 and the second layer 14 includes a thickness in a range of 45 mil to 65 mil. In another embodiment, each of the first layer 12 and the second layer 14 includes a thickness in a range of 50 mil to 65 mil. In another embodiment, each of the first layer 12 and the second layer 14 includes a thickness in a range of 55 mil to 65 mil. In another embodiment, each of the first layer 12 and the second layer 14 includes a thickness in a range of 60 mil to 65 mil.

In another embodiment, each of the first layer 12 and the second layer 14 includes a thickness in a range of 40 mil to 60 mil. In another embodiment, each of the first layer 12 and the second layer 14 includes a thickness in a range of 45 mil to 60 mil. In another embodiment, each of the first layer 12 and the second layer 14 includes a thickness in a range of 50 mil to 60 mil. In another embodiment, each of the first layer 12 and the second layer 14 includes a thickness in a range of 55 mil to 60 mil. In another embodiment, each of the first layer 12 and the second layer 14 includes a thickness in a range of 45 mil to 55 mil. In another embodiment, each of the first layer 12 and the second layer 14 includes a thickness in a range of 50 mil to 55 mil. In another embodiment, each of the first layer 12 and the second layer 14 includes a thickness in a range of 45 mil to 50 mil.

In an embodiment, an impact resistance of the passthrough 10 is characterized by a Class 4 rating in accordance with the standards of ANSI FM 4473 test standards.

Referring to FIGS. 1 through 6, in an embodiment, the passthrough 10 is configured to be installed on a roof deck 100. In an embodiment, the roof deck 100 includes a sloped roof deck. In another embodiment, the roof deck 100 includes a substantially flat roof deck. In an embodiment, the aperture 40 of the first layer 12 of the passthrough 10 is configured to align with an aperture 102 formed within the roof deck 100. In an embodiment, the passthrough 10 is configured to be affixed to the roof deck 100 by a plurality of fasteners 104. In an embodiment, the plurality of fasteners 104 is located intermediate the perimeter 34 of the pocket 32 and the first, second, third and fourth edges 16, 18, 20, 22 of the first layer 12.

In an embodiment, each of the plurality of fasteners 104 is spaced apart from an adjacent one of the fasteners 104 by a distance in a range from 1 inch to 10 inches. In another embodiment, each of the plurality of fasteners 104 is spaced apart from an adjacent one of the fasteners 104 by a distance in a range from 2 inches to 10 inches. In another embodiment, each of the plurality of fasteners 104 is spaced apart from an adjacent one of the fasteners 104 by a distance in a range from 3 inches to 10 inches. In another embodiment, each of the plurality of fasteners 104 is spaced apart from an adjacent one of the fasteners 104 by a distance in a range from 4 inches to 10 inches. In another embodiment, each of the plurality of fasteners 104 is spaced apart from an adjacent one of the fasteners 104 by a distance in a range from 5 inches to 10 inches. In another embodiment, each of the plurality of fasteners 104 is spaced apart from an adjacent one of the fasteners 104 by a distance in a range from 6 inches to 10 inches. In another embodiment, each of the plurality of fasteners 104 is spaced apart from an adjacent one of the fasteners 104 by a distance in a range from 7 inches to 10 inches. In another embodiment, each of the plurality of fasteners 104 is spaced apart from an adjacent one of the fasteners 104 by a distance in a range from 8 inches to 10 inches. In another embodiment, each of the plurality of fasteners 104 is spaced apart from an adjacent one of the fasteners 104 by a distance in a range from 9 inches to 10 inches.

In another embodiment, each of the plurality of fasteners 104 is spaced apart from an adjacent one of the fasteners 104 by a distance in a range from 1 inch to 9 inches. In another embodiment, each of the plurality of fasteners 104 is spaced apart from an adjacent one of the fasteners 104 by a distance in a range from 2 inches to 9 inches. In another embodiment, each of the plurality of fasteners 104 is spaced apart from an adjacent one of the fasteners 104 by a distance in a range from 3 inches to 9 inches. In another embodiment, each of the plurality of fasteners 104 is spaced apart from an adjacent one of the fasteners 104 by a distance in a range from 4 inches to 9 inches. In another embodiment, each of the plurality of fasteners 104 is spaced apart from an adjacent one of the fasteners 104 by a distance in a range from 5 inches to 9 inches. In another embodiment, each of the plurality of fasteners 104 is spaced apart from an adjacent one of the fasteners 104 by a distance in a range from 6 inches to 9 inches. In another embodiment, each of the plurality of fasteners 104 is spaced apart from an adjacent one of the fasteners 104 by a distance in a range from 7 inches to 9 inches. In another embodiment, each of the plurality of fasteners 104 is spaced apart from an adjacent one of the fasteners 104 by a distance in a range from 8 inches to 9 inches.

In another embodiment, each of the plurality of fasteners 104 is spaced apart from an adjacent one of the fasteners 104 by a distance in a range from 1 inch to 8 inches. In another embodiment, each of the plurality of fasteners 104 is spaced apart from an adjacent one of the fasteners 104 by a distance in a range from 2 inches to 8 inches. In another embodiment, each of the plurality of fasteners 104 is spaced apart from an adjacent one of the fasteners 104 by a distance in a range from 3 inches to 8 inches. In another embodiment, each of the plurality of fasteners 104 is spaced apart from an adjacent one of the fasteners 104 by a distance in a range from 4 inches to 8 inches. In another embodiment, each of the plurality of fasteners 104 is spaced apart from an adjacent one of the fasteners 104 by a distance in a range from 5 inches to 8 inches. In another embodiment, each of the plurality of fasteners 104 is spaced apart from an adjacent one of the fasteners 104 by a distance in a range from 6 inches to 8 inches. In another embodiment, each of the plurality of fasteners 104 is spaced apart from an adjacent one of the fasteners 104 by a distance in a range from 7 inches to 8 inches.

In another embodiment, each of the plurality of fasteners 104 is spaced apart from an adjacent one of the fasteners 104 by a distance in a range from 1 inch to 7 inches. In another embodiment, each of the plurality of fasteners 104 is spaced apart from an adjacent one of the fasteners 104 by a distance in a range from 2 inches to 7 inches. In another embodiment, each of the plurality of fasteners 104 is spaced apart from an adjacent one of the fasteners 104 by a distance in a range from 3 inches to 7 inches. In another embodiment, each of the plurality of fasteners 104 is spaced apart from an adjacent one of the fasteners 104 by a distance in a range from 4 inches to 7 inches. In another embodiment, each of the plurality of fasteners 104 is spaced apart from an adjacent one of the fasteners 104 by a distance in a range from 5 inches to 7 inches. In another embodiment, each of the plurality of fasteners 104 is spaced apart from an adjacent one of the fasteners 104 by a distance in a range from 6 inches to 7 inches.

In another embodiment, each of the plurality of fasteners 104 is spaced apart from an adjacent one of the fasteners 104 by a distance in a range from 1 inch to 6 inches. In another embodiment, each of the plurality of fasteners 104 is spaced apart from an adjacent one of the fasteners 104 by a distance in a range from 2 inches to 6 inches. In another embodiment, each of the plurality of fasteners 104 is spaced apart from an adjacent one of the fasteners 104 by a distance in a range from 3 inches to 6 inches. In another embodiment, each of the plurality of fasteners 104 is spaced apart from an adjacent one of the fasteners 104 by a distance in a range from 4 inches to 6 inches. In another embodiment, each of the plurality of fasteners 104 is spaced apart from an adjacent one of the fasteners 104 by a distance in a range from 5 inches to 6 inches.

In another embodiment, each of the plurality of fasteners 104 is spaced apart from an adjacent one of the fasteners 104 by a distance in a range from 1 inch to 5 inches. In another embodiment, each of the plurality of fasteners 104 is spaced apart from an adjacent one of the fasteners 104 by a distance in a range from 2 inches to 5 inches. In another embodiment, each of the plurality of fasteners 104 is spaced apart from an adjacent one of the fasteners 104 by a distance in a range from 3 inches to 5 inches. In another embodiment, each of the plurality of fasteners 104 is spaced apart from an adjacent one of the fasteners 104 by a distance in a range from 4 inches to 5 inches.

In another embodiment, each of the plurality of fasteners 104 is spaced apart from an adjacent one of the fasteners 104 by a distance in a range from 1 inch to 4 inches. In another embodiment, each of the plurality of fasteners 104 is spaced apart from an adjacent one of the fasteners 104 by a distance in a range from 2 inches to 4 inches. In another embodiment, each of the plurality of fasteners 104 is spaced apart from an adjacent one of the fasteners 104 by a distance in a range from 3 inches to 4 inches.

In another embodiment, each of the plurality of fasteners 104 is spaced apart from an adjacent one of the fasteners 104 by a distance in a range from 1 inch to 3 inches. In another embodiment, each of the plurality of fasteners 104 is spaced apart from an adjacent one of the fasteners 104 by a distance in a range from 2 inches to 3 inches. In another embodiment, each of the plurality of fasteners 104 is spaced apart from an adjacent one of the fasteners 104 by a distance in a range from 1 inch to 2 inches.

In another embodiment, each of the plurality of fasteners 104 is spaced apart from an adjacent one of the fasteners 104 by 1 inch. In another embodiment, each of the plurality of fasteners 104 is spaced apart from an adjacent one of the fasteners 104 by 2 inches. In another embodiment, each of the plurality of fasteners 104 is spaced apart from an adjacent one of the fasteners 104 by 3 inches. In another embodiment, each of the plurality of fasteners 104 is spaced apart from an adjacent one of the fasteners 104 by 4 inches. In another embodiment, each of the plurality of fasteners 104 is spaced apart from an adjacent one of the fasteners 104 by 5 inches. In another embodiment, each of the plurality of fasteners 104 is spaced apart from an adjacent one of the fasteners 104 by 6 inches. In another embodiment, each of the plurality of fasteners 104 is spaced apart from an adjacent one of the fasteners 104 by 7 inches. In another embodiment, each of the plurality of fasteners 104 is spaced apart from an adjacent one of the fasteners 104 by 8 inches. In another embodiment, each of the plurality of fasteners 104 is spaced apart from an adjacent one of the fasteners 104 by 9 inches. In another embodiment, each of the plurality of fasteners 104 is spaced apart from an adjacent one of the fasteners 104 by 10 inches.

In an embodiment, the plurality of fasteners 104 includes a plurality of nails. In another embodiment, the plurality of fasteners 104 includes a plurality of screws. In another embodiment, the plurality of fasteners 104 includes a plurality of staples. In another embodiment, the plurality of fasteners 104 includes a plurality of rivets.

In another embodiment, the passthrough 10 is configured to be affixed to the roof deck 100 by an adhesive. In an embodiment, the first layer 12 is affixed to the roof deck 100 by the adhesive.

In an embodiment, at least one watershedding layer is configured to overlap the passthrough 10 when installed on the roof deck 100. In an embodiment, the at least one watershedding layer includes a plurality of watershedding layers. In another embodiment, at least one shingle is configured to overlap the passthrough 10 when installed on the roof deck 100. In an embodiment, the at least one shingle includes a plurality of shingles. In another embodiment, flashing may be installed around and adjacent to the passthrough 10.

In an embodiment, the passthrough 10 is configured to receive at least one cable 200 having a first end 202 and a second end 204 opposite the first end 202. In an embodiment, the aperture 40 of the first layer 12 of the passthrough 10 is sized and shaped to receive the first end 202 of the at least one cable 200. In an embodiment, the second end 204 of the at least one cable 200 is configured to extend through the opening 33 and outwardly from the first edge 16 of the first layer 12 and the first edge 24 of the second layer 14. In an embodiment, the opening 33 is sealed by a sealant. In an embodiment, the sealant includes butyl, silicone, rubber, epoxy, latex, neoprene, or polyurethane foam. In an embodiment, the second end 204 of the at least one cable 200 is configured to be positioned intermediate the first layer 12 and the second layer 14. In an embodiment, each of the first and second ends 202, 204 of the at least one cable 200 includes an electrical connector 205. In an embodiment, the connector 205 of the second end 204 of the at least one cable 200 is configured to be electrically connected to a photovoltaic junction box. In an embodiment, the at least one cable 200 includes a plurality of the cables 200.

In an embodiment, the passthrough 10 includes a thickness in a range of 1 mm to 15 mm. In another embodiment, the passthrough 10 includes a thickness in a range of 2 mm to 15 mm. In another embodiment, the passthrough 10 includes a thickness in a range of 3 mm to 15 mm. In another embodiment, the passthrough 10 includes a thickness in a range of 4 mm to 15 mm. In another embodiment, the passthrough 10 includes a thickness in a range of 5 mm to 15 mm. In another embodiment, the passthrough 10 includes a thickness in a range of 6 mm to 15 mm. In another embodiment, the passthrough 10 includes a thickness in a range of 7 mm to 15 mm. In another embodiment, the passthrough 10 includes a thickness in a range of 8 mm to 15 mm. In another embodiment, the passthrough 10 includes a thickness in a range of 9 mm to 15 mm. In another embodiment, the passthrough 10 includes a thickness in a range of 10 mm to 15 mm. In another embodiment, the passthrough 10 includes a thickness in a range of 11 mm to 15 mm. In another embodiment, the passthrough 10 includes a thickness in a range of 12 mm to 15 mm. In another embodiment, the passthrough 10 includes a thickness in a range of 13 mm to 15 mm. In another embodiment, the passthrough 10 includes a thickness in a range of 14 mm to 15 mm.

In another embodiment, the passthrough 10 includes a thickness in a range of 1 mm to 14 mm. In another embodiment, the passthrough 10 includes a thickness in a range of 2 mm to 14 mm. In another embodiment, the passthrough 10 includes a thickness in a range of 3 mm to 14 mm. In another embodiment, the passthrough 10 includes a thickness in a range of 4 mm to 14 mm. In another embodiment, the passthrough 10 includes a thickness in a range of 5 mm to 14 mm. In another embodiment, the passthrough 10 includes a thickness in a range of 6 mm to 14 mm. In another embodiment, the passthrough 10 includes a thickness in a range of 7 mm to 14 mm. In another embodiment, the passthrough 10 includes a thickness in a range of 8 mm to 14 mm. In another embodiment, the passthrough 10 includes a thickness in a range of 9 mm to 14 mm. In another embodiment, the passthrough 10 includes a thickness in a range of 10 mm to 14 mm. In another embodiment, the passthrough 10 includes a thickness in a range of 11 mm to 14 mm. In another embodiment, the passthrough 10 includes a thickness in a range of 12 mm to 14 mm. In another embodiment, the passthrough 10 includes a thickness in a range of 13 mm to 14 mm.

In another embodiment, the passthrough 10 includes a thickness in a range of 1 mm to 13 mm. In another embodiment, the passthrough 10 includes a thickness in a range of 2 mm to 13 mm. In another embodiment, the passthrough 10 includes a thickness in a range of 3 mm to 13 mm. In another embodiment, the passthrough 10 includes a thickness in a range of 4 mm to 13 mm. In another embodiment, the passthrough 10 includes a thickness in a range of 5 mm to 13 mm. In another embodiment, the passthrough 10 includes a thickness in a range of 6 mm to 13 mm. In another embodiment, the passthrough 10 includes a thickness in a range of 7 mm to 13 mm. In another embodiment, the passthrough 10 includes a thickness in a range of 8 mm to 13 mm. In another embodiment, the passthrough 10 includes a thickness in a range of 9 mm to 13 mm. In another embodiment, the passthrough 10 includes a thickness in a range of 10 mm to 13 mm. In another embodiment, the passthrough 10 includes a thickness in a range of 11 mm to 13 mm. In another embodiment, the passthrough 10 includes a thickness in a range of 12 mm to 13 mm.

In another embodiment, the passthrough 10 includes a thickness in a range of 1 mm to 12 mm. In another embodiment, the passthrough 10 includes a thickness in a range of 2 mm to 12 mm. In another embodiment, the passthrough 10 includes a thickness in a range of 3 mm to 12 mm. In another embodiment, the passthrough 10 includes a thickness in a range of 4 mm to 12 mm. In another embodiment, the passthrough 10 includes a thickness in a range of 5 mm to 12 mm. In another embodiment, the passthrough 10 includes a thickness in a range of 6 mm to 12 mm. In another embodiment, the passthrough 10 includes a thickness in a range of 7 mm to 12 mm. In another embodiment, the passthrough 10 includes a thickness in a range of 8 mm to 12 mm. In another embodiment, the passthrough 10 includes a thickness in a range of 9 mm to 12 mm. In another embodiment, the passthrough 10 includes a thickness in a range of 10 mm to 12 mm. In another embodiment, the passthrough 10 includes a thickness in a range of 11 mm to 12 mm.

In another embodiment, the passthrough 10 includes a thickness in a range of 1 mm to 11 mm. In another embodiment, the passthrough 10 includes a thickness in a range of 2 mm to 11 mm. In another embodiment, the passthrough 10 includes a thickness in a range of 3 mm to 11 mm. In another embodiment, the passthrough 10 includes a thickness in a range of 4 mm to 11 mm. In another embodiment, the passthrough 10 includes a thickness in a range of 5 mm to 11 mm. In another embodiment, the passthrough 10 includes a thickness in a range of 6 mm to 11 mm. In another embodiment, the passthrough 10 includes a thickness in a range of 7 mm to 11 mm. In another embodiment, the passthrough 10 includes a thickness in a range of 8 mm to 11 mm. In another embodiment, the passthrough 10 includes a thickness in a range of 9 mm to 11 mm. In another embodiment, the passthrough 10 includes a thickness in a range of 10 mm to 11 mm.

In another embodiment, the passthrough 10 includes a thickness in a range of 1 mm to 10 mm. In another embodiment, the passthrough 10 includes a thickness in a range of 2 mm to 10 mm. In another embodiment, the passthrough 10 includes a thickness in a range of 3 mm to 10 mm. In another embodiment, the passthrough 10 includes a thickness in a range of 4 mm to 10 mm. In another embodiment, the passthrough 10 includes a thickness in a range of 5 mm to 10 mm. In another embodiment, the passthrough 10 includes a thickness in a range of 6 mm to 10 mm. In another embodiment, the passthrough 10 includes a thickness in a range of 7 mm to 10 mm. In another embodiment, the passthrough 10 includes a thickness in a range of 8 mm to 10 mm. In another embodiment, the passthrough 10 includes a thickness in a range of 9 mm to 10 mm.

In another embodiment, the passthrough 10 includes a thickness in a range of 1 mm to 9 mm. In another embodiment, the passthrough 10 includes a thickness in a range of 2 mm to 9 mm. In another embodiment, the passthrough 10 includes a thickness in a range of 3 mm to 9 mm. In another embodiment, the passthrough 10 includes a thickness in a range of 4 mm to 9 mm. In another embodiment, the passthrough 10 includes a thickness in a range of 5 mm to 9 mm. In another embodiment, the passthrough 10 includes a thickness in a range of 6 mm to 9 mm. In another embodiment, the passthrough 10 includes a thickness in a range of 7 mm to 9 mm. In another embodiment, the passthrough 10 includes a thickness in a range of 8 mm to 9 mm.

In another embodiment, the passthrough 10 includes a thickness in a range of 1 mm to 8 mm. In another embodiment, the passthrough 10 includes a thickness in a range of 2 mm to 8 mm. In another embodiment, the passthrough 10 includes a thickness in a range of 3 mm to 8 mm. In another embodiment, the passthrough 10 includes a thickness in a range of 4 mm to 8 mm. In another embodiment, the passthrough 10 includes a thickness in a range of 5 mm to 8 mm. In another embodiment, the passthrough 10 includes a thickness in a range of 6 mm to 8 mm. In another embodiment, the passthrough 10 includes a thickness in a range of 7 mm to 8 mm.

In another embodiment, the passthrough 10 includes a thickness in a range of 1 mm to 7 mm. In another embodiment, the passthrough 10 includes a thickness in a range of 2 mm to 7 mm. In another embodiment, the passthrough 10 includes a thickness in a range of 3 mm to 7 mm. In another embodiment, the passthrough 10 includes a thickness in a range of 4 mm to 7 mm. In another embodiment, the passthrough 10 includes a thickness in a range of 5 mm to 7 mm. In another embodiment, the passthrough 10 includes a thickness in a range of 6 mm to 7 mm.

In another embodiment, the passthrough 10 includes a thickness in a range of 1 mm to 6 mm. In another embodiment, the passthrough 10 includes a thickness in a range of 2 mm to 6 mm. In another embodiment, the passthrough 10 includes a thickness in a range of 3 mm to 6 mm. In another embodiment, the passthrough 10 includes a thickness in a range of 4 mm to 6 mm. In another embodiment, the passthrough 10 includes a thickness in a range of 5 mm to 6 mm.

In another embodiment, the passthrough 10 includes a thickness in a range of 1 mm to 5 mm. In another embodiment, the passthrough 10 includes a thickness in a range of 2 mm to 5 mm. In another embodiment, the passthrough 10 includes a thickness in a range of 3 mm to 5 mm. In another embodiment, the passthrough 10 includes a thickness in a range of 4 mm to 5 mm.

In another embodiment, the passthrough 10 includes a thickness in a range of 1 mm to 4 mm. In another embodiment, the passthrough 10 includes a thickness in a range of 2 mm to 4 mm. In another embodiment, the passthrough 10 includes a thickness in a range of 3 mm to 4 mm.

In another embodiment, the passthrough 10 includes a thickness in a range of 1 mm to 3 mm. In another embodiment, the passthrough 10 includes a thickness in a range of 2 mm to 3 mm. In another embodiment, the passthrough 10 includes a thickness in a range of 1 mm to 2 mm.

Figure 7:
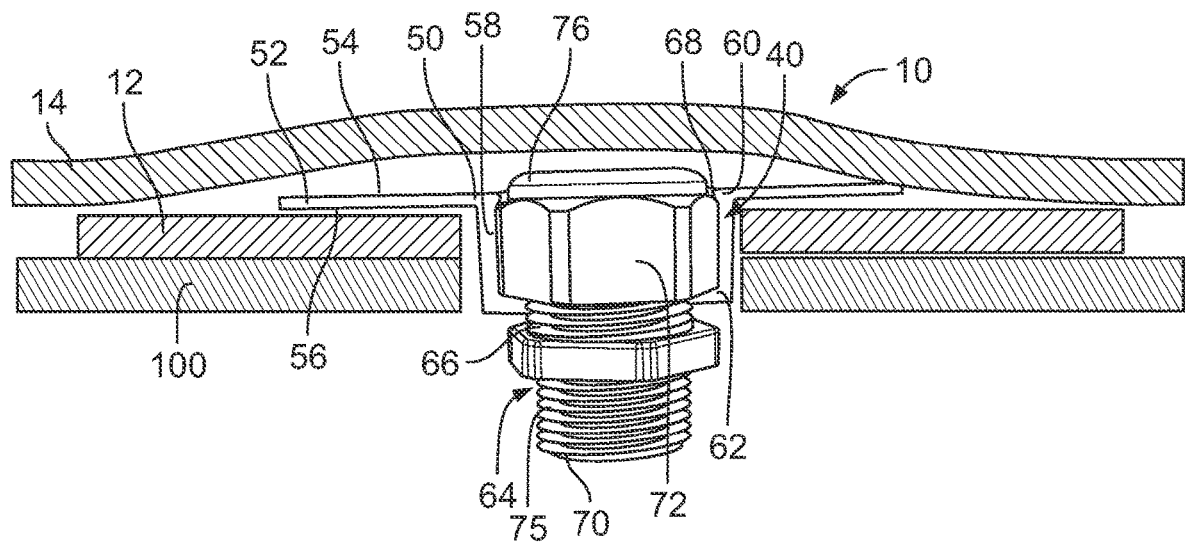
FIG. 7 is a photo of a side elevational, partially cross-sectional view of an embodiment of an electrical cable passthrough showing a base plate and a sealing gland employed by the passthrough.
Figure 8:
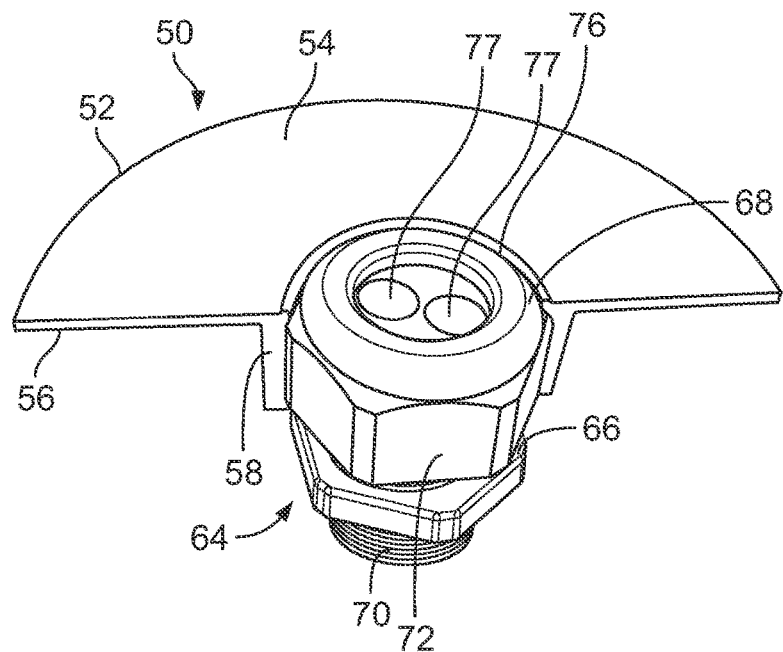
FIG. 8 is a photo of top perspective view of the base plate and sealing gland shown in FIG. 7.

Referring to FIGS. 7 and 8, the passthrough 10 includes a base plate 50 having a base 52 with first surface 54 and a second surface 56 opposite the first surface 54, and a tubular member 58 extending outwardly from the second surface 56 of the base 52. In an embodiment, the tubular member 58 of the base plate 50 includes a first end 60 located at the base 52 and a second end 62 opposite the first end 60 and distal from the base 52. In an embodiment, the tubular member 58 is sized and shaped to be positioned through the aperture 40 of the passthrough 10 and the aperture 102 of the roof deck 100 when the passthrough 10 is installed on the roof deck 100. In an embodiment, the base 52 of the base plate 50 is configured to be positioned substantially flush with the roof deck 100. In an embodiment, the base plate 50 is made from plastic. In an embodiment, the base plate 50 is made from polypropylene. In an embodiment, the base plate 50 is made from a polymer blend with polypropylene as a base resin. In another embodiment, the base plate 50 is made from thermoplastic polyolefin (TPO). In another embodiment, the TPO is a modified TPO including fiberglass and/or other filler material. In another embodiment, the base plate 50 is made from metal. In an embodiment, the base plate 50 is made of aluminum. In another embodiment, the base plate 50 is made of stainless steel.

In an embodiment, a thickness of the base 52 of the base plate 50 is in a range of 0.5 mm to 5 mm. In another embodiment, the thickness of the base 52 of the base plate 50 is in a range of 1 mm to 5 mm. In another embodiment, the thickness of the base 52 of the base plate 50 is in a range of 1.5 mm to 5 mm. In another embodiment, the thickness of the base 52 of the base plate 50 is in a range of 2 mm to 5 mm. In another embodiment, the thickness of the base 52 of the base plate 50 is in a range of 2.5 mm to 5 mm. In another embodiment, the thickness of the base 52 of the base plate 50 is in a range of 3 mm to 5 mm. In another embodiment, the thickness of the base 52 of the base plate 50 is in a range of 3.5 mm to 5 mm. In another embodiment, the thickness of the base 52 of the base plate 50 is in a range of 4 mm to 5 mm. In another embodiment, the thickness of the base 52 of the base plate 50 is in a range of 4.5 mm to 5 mm.

In another embodiment, the thickness of the base 52 of the base plate 50 is in a range of 0.5 mm to 4.5 mm. In another embodiment, the thickness of the base 52 of the base plate 50 is in a range of 1 mm to 4.5 mm. In another embodiment, the thickness of the base 52 of the base plate 50 is in a range of 1.5 mm to 4.5 mm. In another embodiment, the thickness of the base 52 of the base plate 50 is in a range of 2 mm to 4.5 mm. In another embodiment, the thickness of the base 52 of the base plate 50 is in a range of 2.5 mm to 4.5 mm. In another embodiment, the thickness of the base 52 of the base plate 50 is in a range of 3 mm to 4.5 mm. In another embodiment, the thickness of the base 52 of the base plate 50 is in a range of 3.5 mm to 4.5 mm. In another embodiment, the thickness of the base 52 of the base plate 50 is in a range of 4 mm to 4.5 mm.

In another embodiment, the thickness of the base 52 of the base plate 50 is in a range of 0.5 mm to 4 mm. In another embodiment, the thickness of the base 52 of the base plate 50 is in a range of 1 mm to 4 mm. In another embodiment, the thickness of the base 52 of the base plate 50 is in a range of 1.5 mm to 4 mm. In another embodiment, the thickness of the base 52 of the base plate 50 is in a range of 2 mm to 4 mm. In another embodiment, the thickness of the base 52 of the base plate 50 is in a range of 2.5 mm to 4 mm. In another embodiment, the thickness of the base 52 of the base plate 50 is in a range of 3 mm to 4 mm. In another embodiment, the thickness of the base 52 of the base plate 50 is in a range of 3.5 mm to 4 mm.

In another embodiment, the thickness of the base 52 of the base plate 50 is in a range of 0.5 mm to 3.5 mm. In another embodiment, the thickness of the base 52 of the base plate 50 is in a range of 1 mm to 3.5 mm. In another embodiment, the thickness of the base 52 of the base plate 50 is in a range of 1.5 mm to 3.5 mm. In another embodiment, the thickness of the base 52 of the base plate 50 is in a range of 2 mm to 3.5 mm. In another embodiment, the thickness of the base 52 of the base plate 50 is in a range of 2.5 mm to 3.5 mm. In another embodiment, the thickness of the base 52 of the base plate 50 is in a range of 3 mm to 3.5 mm.

In another embodiment, the thickness of the base 52 of the base plate 50 is in a range of 0.5 mm to 3 mm. In another embodiment, the thickness of the base 52 of the base plate 50 is in a range of 1 mm to 3 mm. In another embodiment, the thickness of the base 52 of the base plate 50 is in a range of 1.5 mm to 3 mm. In another embodiment, the thickness of the base 52 of the base plate 50 is in a range of 2 mm to 3 mm. In another embodiment, the thickness of the base 52 of the base plate 50 is in a range of 2.5 mm to 3 mm.

In another embodiment, the thickness of the base 52 of the base plate 50 is in a range of 0.5 mm to 2.5 mm. In another embodiment, the thickness of the base 52 of the base plate 50 is in a range of 1 mm to 2.5 mm. In another embodiment, the thickness of the base 52 of the base plate 50 is in a range of 1.5 mm to 2.5 mm. In another embodiment, the thickness of the base 52 of the base plate 50 is in a range of 2 mm to 2.5 mm.

In another embodiment, the thickness of the base 52 of the base plate 50 is in a range of 0.5 mm to 2 mm. In another embodiment, the thickness of the base 52 of the base plate 50 is in a range of 1 mm to 2 mm. In another embodiment, the thickness of the base 52 of the base plate 50 is in a range of 1.5 mm to 2 mm. In another embodiment, the thickness of the base 52 of the base plate 50 is in a range of 0.5 mm to 1.5 mm. In another embodiment, the thickness of the base 52 of the base plate 50 is in a range of 1 mm to 1.5 mm. In another embodiment, the thickness of the base 52 of the base plate 50 is in a range of 0.5 mm to 1 mm.

Referring to FIGS. 7 and 8, in an embodiment, the passthrough 10 includes a cable gland 64 installed within the base plate 50. In an embodiment, the cable gland 64 includes a body 66 having a first end 68 and a second end 70 opposite the first end 68. In an embodiment, the body 66 includes a sealing nut 72 located at the first end 68 of the body 66. In an embodiment, the sealing nut 72 is sized and shaped to be positioned within the tubular member 58 of the base plate 50. In an embodiment, a raceway 74 is attached to the second end 70 of the body 66 of the cable gland 64 (see FIG. 5). In an embodiment, the second end 70 of the body 66 of the cable gland 64 includes external threads 75. In an embodiment, the raceway 74 includes internal threads that threadedly mate with the external threads 75 of the cable gland 64. In an embodiment, the cable gland 64 includes a grommet 76 at the first end 68 of the body 66. In an embodiment, the grommet 76 is substantially flush with the first surface 54 of the base 52 of the base plate 50. In another embodiment, the grommet 76 is flush with the first surface 54 of the base 52 of the base plate 50.

Figure 9:
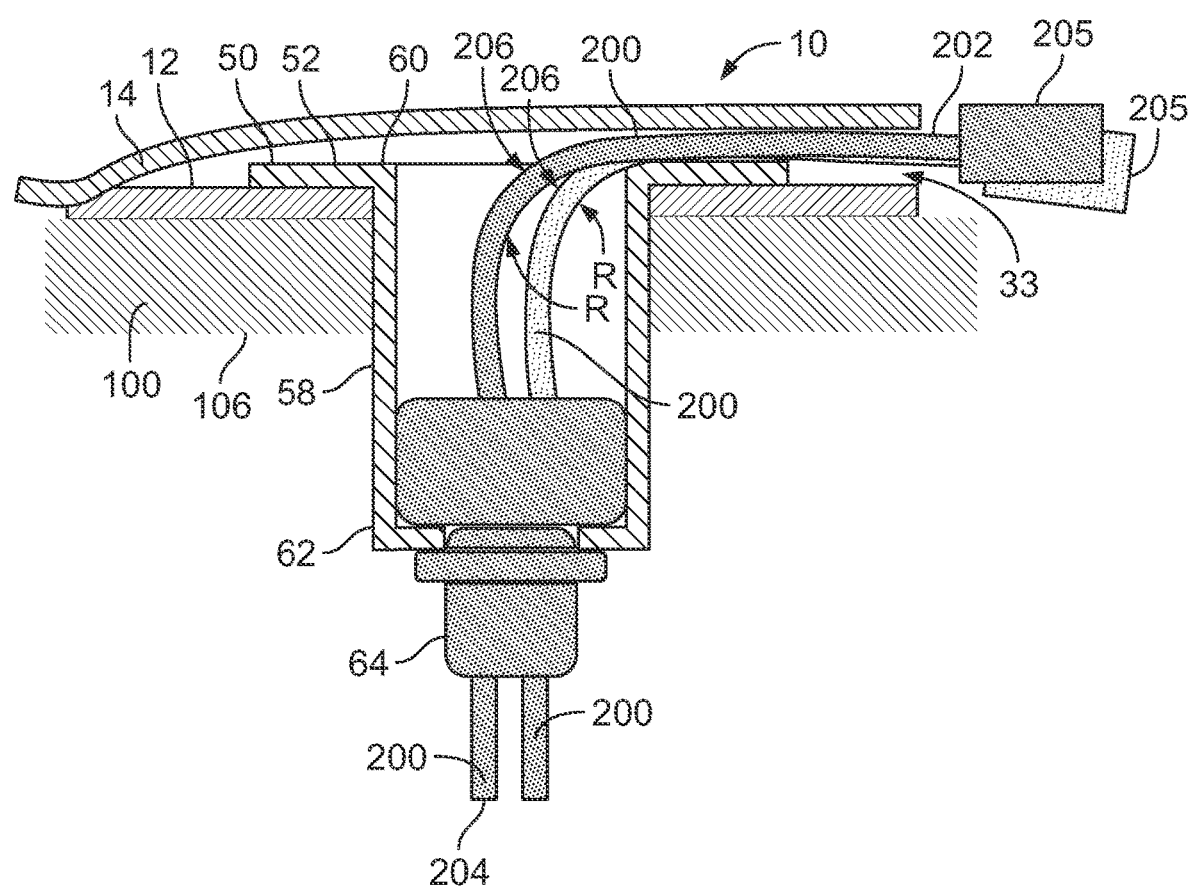
FIG. 9 is a schematic side elevational view of an embodiment of an electrical cable passthrough.

Referring to FIGS. 8 and 9, in an embodiment, the cable gland 64 is positioned within the tubular member 58 at the second end 62 thereof. In another embodiment, the grommet 76 is positioned at the second end 62 of the tubular member 58. In an embodiment, the grommet 76 is positioned below an inner surface 106 of the roof deck 100 when the passthrough 10 is installed on the roof deck 100. In an embodiment, the grommet 76 includes at least one wire hole 77 that is sized and shaped to receive a corresponding one of the at least one cable 200. In an embodiment, the passthrough 10 is configured to receive the least one cable 200 having a bend 206 with a bend radius R in a range of 10 mm to 20 mm. In another embodiment, the bend radius R is in a range of 11 mm to 20 mm. In another embodiment, the bend radius R is in a range of 12 mm to 20 mm. In another embodiment, the bend radius R is in a range of 13 mm to 20 mm. In another embodiment, the bend radius R is in a range of 14 mm to 20 mm. In another embodiment, the bend radius R is in a range of 15 mm to 20 mm. In another embodiment, the bend radius R is in a range of 16 mm to 20 mm. In another embodiment, the bend radius R is in a range of 17 mm to 20 mm. In another embodiment, the bend radius R is in a range of 18 mm to 20 mm. In another embodiment, the bend radius R is in a range of 19 mm to 20 mm.

In another embodiment, the bend radius R is in a range of 10 mm to 19 mm. In another embodiment, the bend radius R is in a range of 11 mm to 19 mm. In another embodiment, the bend radius R is in a range of 12 mm to 19 mm. In another embodiment, the bend radius R is in a range of 13 mm to 19 mm. In another embodiment, the bend radius R is in a range of 14 mm to 19 mm. In another embodiment, the bend radius R is in a range of 15 mm to 19 mm. In another embodiment, the bend radius R is in a range of 16 mm to 19 mm. In another embodiment, the bend radius R is in a range of 17 mm to 19 mm. In another embodiment, the bend radius R is in a range of 18 mm to 19 mm.

In another embodiment, the bend radius R is in a range of 10 mm to 18 mm. In another embodiment, the bend radius R is in a range of 11 mm to 18 mm. In another embodiment, the bend radius R is in a range of 12 mm to 18 mm. In another embodiment, the bend radius R is in a range of 13 mm to 18 mm. In another embodiment, the bend radius R is in a range of 14 mm to 18 mm. In another embodiment, the bend radius R is in a range of 15 mm to 18 mm. In another embodiment, the bend radius R is in a range of 16 mm to 18 mm. In another embodiment, the bend radius R is in a range of 17 mm to 18 mm.

In another embodiment, the bend radius R is in a range of 10 mm to 17 mm. In another embodiment, the bend radius R is in a range of 11 mm to 17 mm. In another embodiment, the bend radius R is in a range of 12 mm to 17 mm. In another embodiment, the bend radius R is in a range of 13 mm to 17 mm. In another embodiment, the bend radius R is in a range of 14 mm to 17 mm. In another embodiment, the bend radius R is in a range of 15 mm to 17 mm. In another embodiment, the bend radius R is in a range of 16 mm to 17 mm.

In another embodiment, the bend radius R is in a range of 10 mm to 16 mm. In another embodiment, the bend radius R is in a range of 11 mm to 16 mm. In another embodiment, the bend radius R is in a range of 12 mm to 16 mm. In another embodiment, the bend radius R is in a range of 13 mm to 16 mm. In another embodiment, the bend radius R is in a range of 14 mm to 16 mm. In another embodiment, the bend radius R is in a range of 15 mm to 16 mm.

In another embodiment, the bend radius R is in a range of 10 mm to 15 mm. In another embodiment, the bend radius R is in a range of 11 mm to 15 mm. In another embodiment, the bend radius R is in a range of 12 mm to 15 mm. In another embodiment, the bend radius R is in a range of 13 mm to 15 mm. In another embodiment, the bend radius R is in a range of 14 mm to 15 mm.

In another embodiment, the bend radius R is in a range of 10 mm to 14 mm. In another embodiment, the bend radius R is in a range of 11 mm to 14 mm. In another embodiment, the bend radius R is in a range of 12 mm to 14 mm. In another embodiment, the bend radius R is in a range of 13 mm to 14 mm.

In another embodiment, the bend radius R is in a range of 10 mm to 13 mm. In another embodiment, the bend radius R is in a range of 11 mm to 13 mm. In another embodiment, the bend radius R is in a range of 12 mm to 13 mm. In another embodiment, the bend radius R is in a range of 10 mm to 12 mm. In another embodiment, the bend radius R is in a range of 11 mm to 12 mm. In another embodiment, the bend radius R is in a range of 10 mm to 11 mm.

Figure 10:
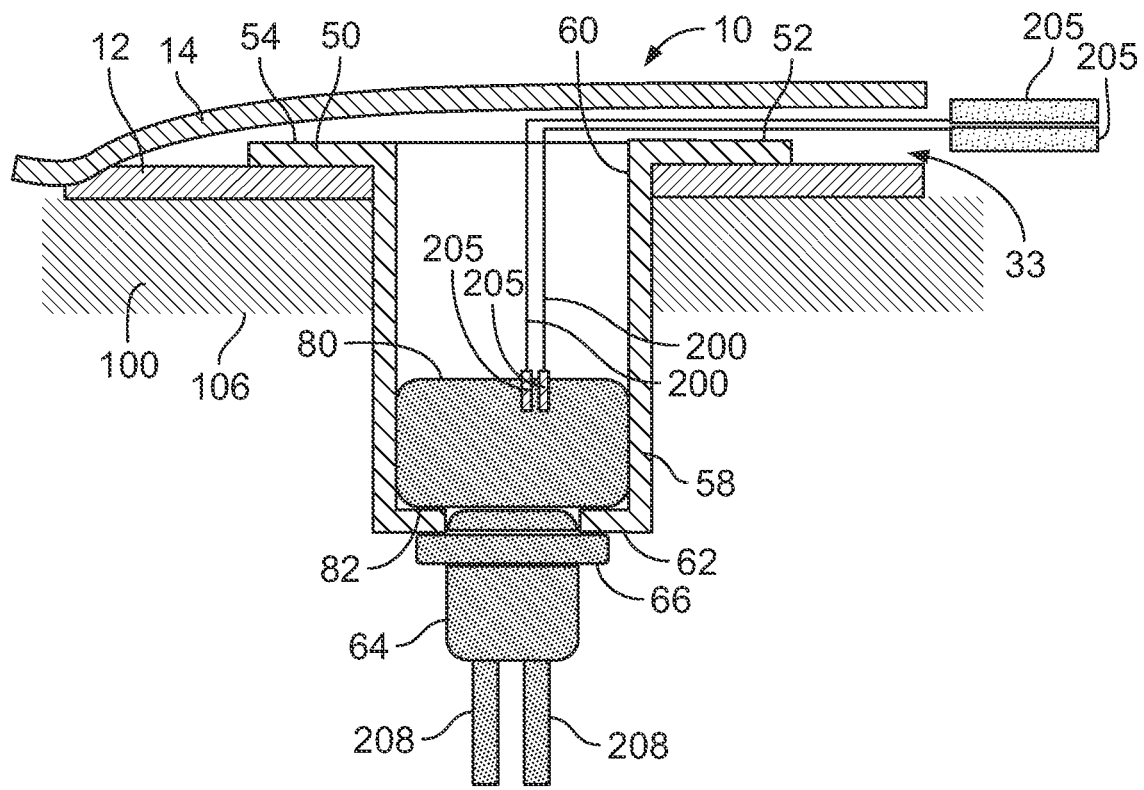
FIG. 10 is a schematic side elevational view of an embodiment of an electrical cable passthrough.
Figure 11:
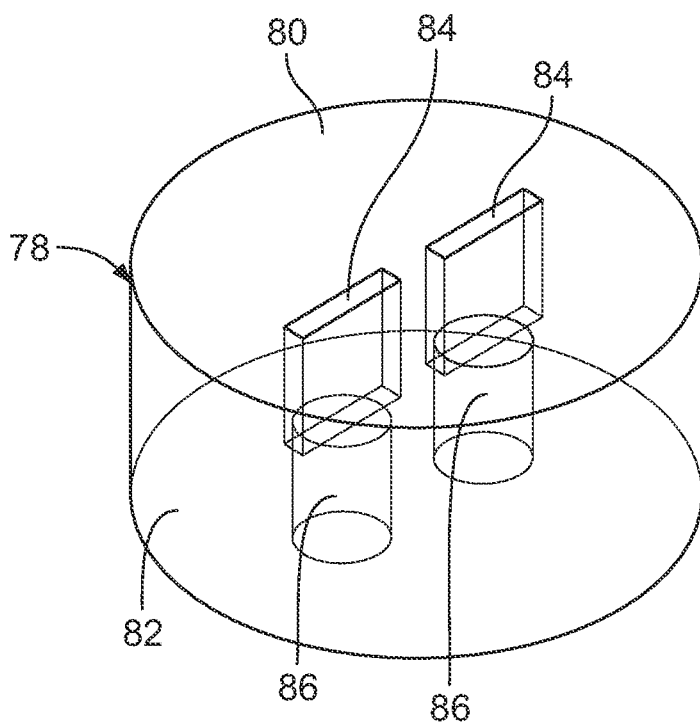
FIG. 11 is a top perspective view of an embodiment of a socket employed by the electrical cable passthrough of FIG. 10.
Figure 12:
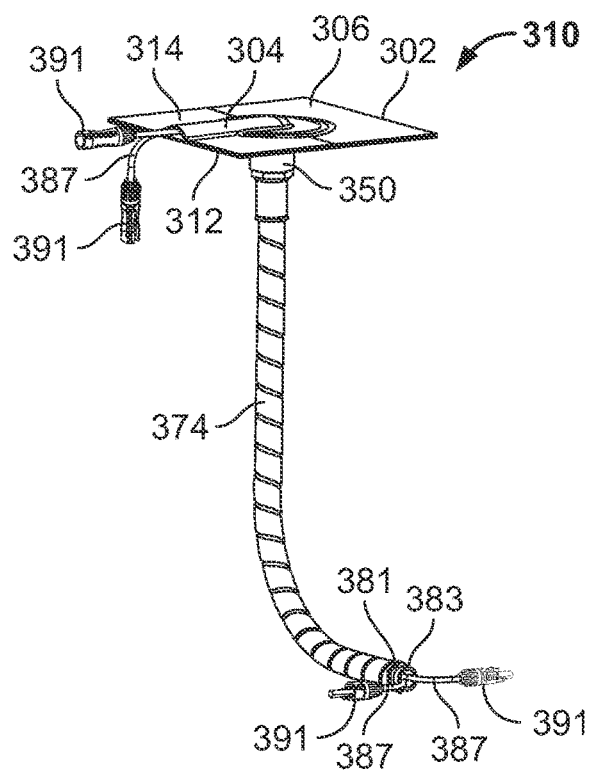
FIGS. 12 and 13 show a perspective view and an exploded perspective view, respectively, of an embodiment of an electrical cable passthrough.
Figure 13:
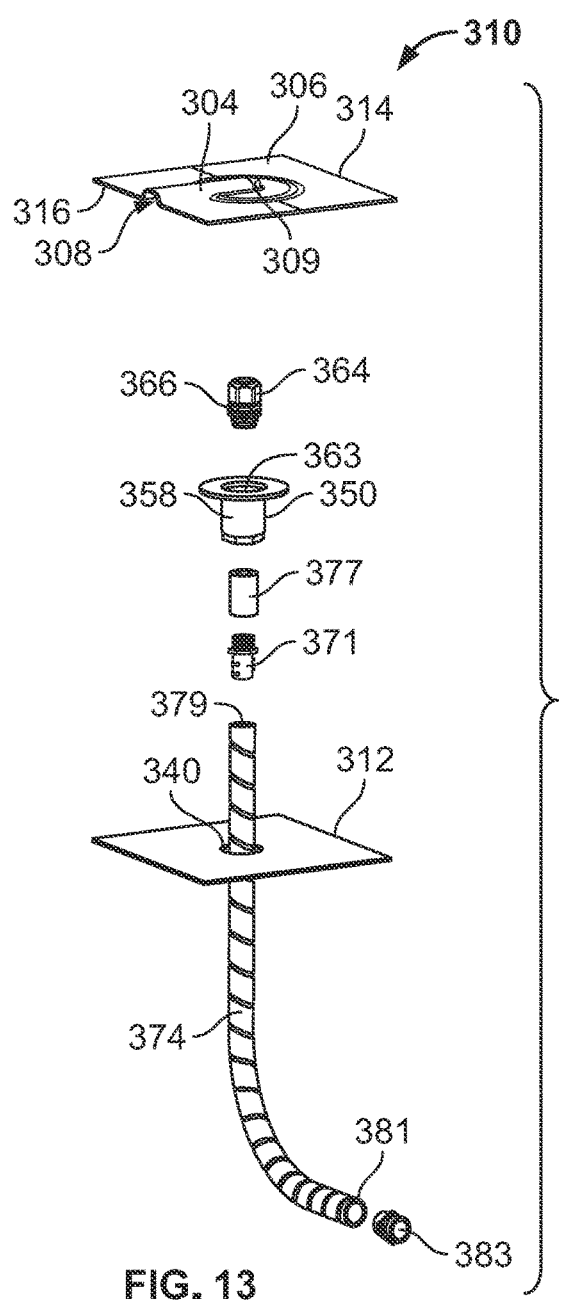
Figure 14:
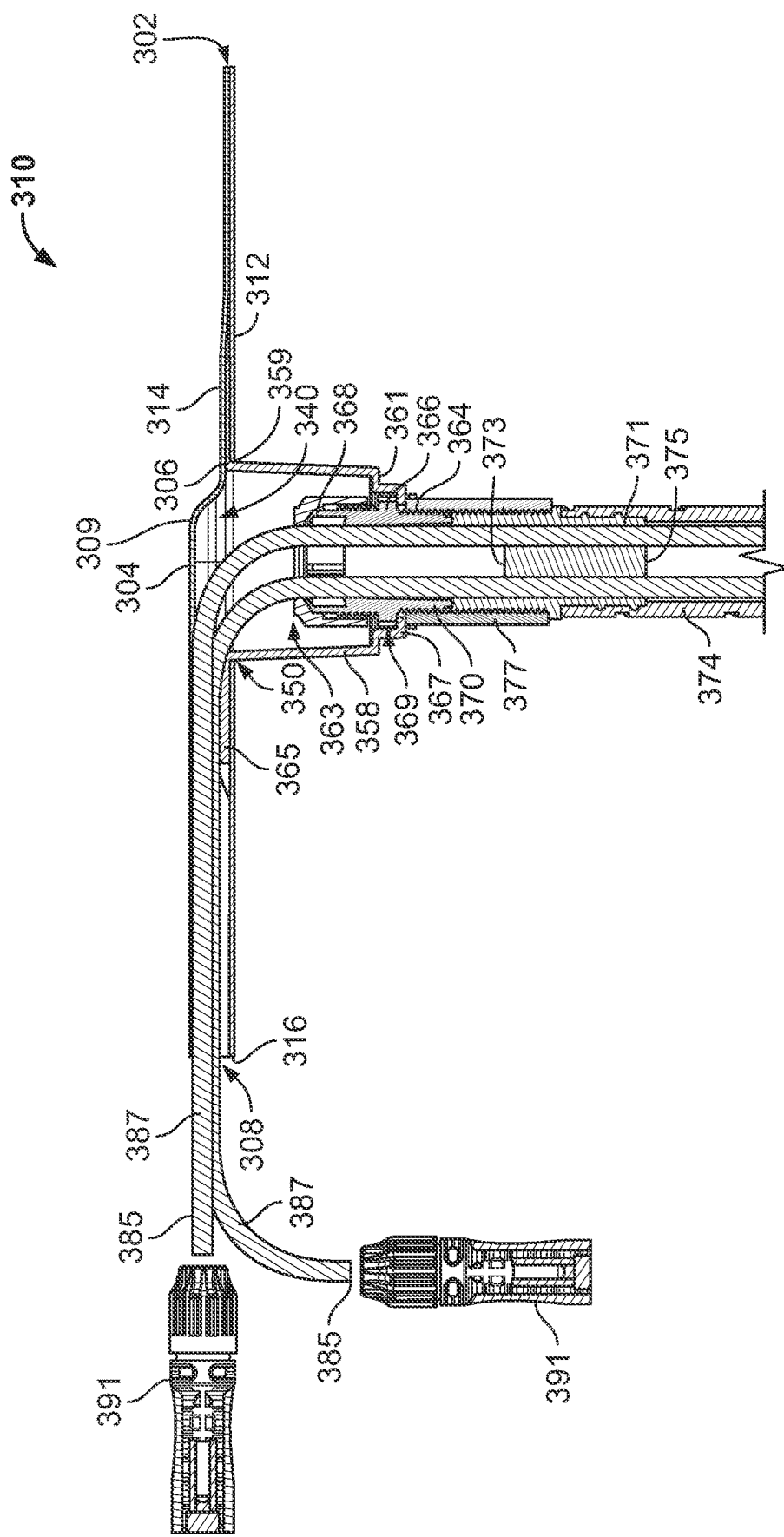
FIG. 14 shows a side cross-sectional view of the electrical cable passthrough shown in FIGS. 12 and 13.

Referring to FIGS. 10 and 11, in another embodiment, the cable gland 64 includes a socket 78 located at the first end 68 of the body 66. In another embodiment, the socket 78 is positioned at the second end 62 of the tubular member 58. In an embodiment, the socket 78 is positioned below the inner surface 106 of the roof deck 100 when the passthrough 10 is installed on the roof deck 100. In another embodiment, the socket 78 is substantially flush with the first surface 54 of the base 52 of the base plate 50.

Still referring to FIGS. 10 and 11, in an embodiment, the socket 78 includes a first surface 80, a second surface 82 opposite the first surface 80, at least one first receptacle 84 within the first surface 80, and at least one second receptacle 86 within the second surface 82 and in communication with a corresponding one of the at least one first receptacle 84. In an embodiment, the at least one first receptacle 84 includes a plurality of first receptacles 84, and the at least one second receptacle 86 includes a plurality of second receptacles 86. In an embodiment, the socket 78 includes two of the first receptacles 84 and two of the second receptacles 86. In an embodiment, each of the receptacles 84 is configured to receive the connector 205 of a corresponding one of the cables 200, and each of second receptacles 86 is configured to receive a connector of a cable 208. In an embodiment, each of the cables 200 includes a flat wire. In another embodiment, the cable 208 includes a round wire. In another embodiment, each of the cables 200, 208 includes a flat wire. In another embodiment, each of the cables 200, 208 includes a round wire. In an embodiment, the opening 33 is sealed with the sealant as referenced above.

In an embodiment, the passthrough 10 is configured for use with electrical systems of building-integrated photovoltaic (BIPV) systems. In another embodiment, the passthrough 10 is configured for use with retrofit photovoltaic systems for roofing. In other embodiments, the passthrough 10 is configured for use with other electrical systems.

FIGS. 12 through 15 show an embodiment of an electrical cable passthrough 310. The electrical cable passthrough 310 has a structure and function similar to the electrical cable passthrough 10 with the following noted differences. In an embodiment, the electrical cable passthrough 310 includes top portion 302 having a first layer 312, a second layer 314 overlapping the first layer 312, and a raised channel 304 extending outwardly from a first surface 306 of the second layer 314. In an embodiment, the channel 304 extends from an opening 308 located proximate to a first edge 316 of the top portion 302 to an end 309 located proximate to a central point of the top portion 302. In an embodiment, the end 309 is integral with a centrally-located aperture 340 extending through the first layer 312. In an embodiment, the top portion 302 is configured to be positioned substantially flush with a roof deck.

In an embodiment, the electrical cable passthrough 310 includes a flange element 350 having a tubular portion 358 with a first end 359, a second end 361 opposite the first end 359, and an aperture 363 extending from the first end 359 to the second end 361, and a flanged portion 365 extending radially from the first end 359. In an embodiment, an annular tip 367 extends from the second end 361 of the tubular portion 358 and includes a chamber 369. In an embodiment, the tubular portion 358 tapers from the first end 359 to the second end 361. In an embodiment, the flange element 350 is inserted within the aperture 340 of the first layer 312. In an embodiment, the flanged portion 365 of the flange element 350 is located intermediate the first layer 312 and the second layer 314 and the tubular portion 358 extends outwardly from the first layer 312.

In an embodiment, a cable gland 364 includes a first end 368 and a second end 370 opposite the first end 368. In an embodiment, the cable gland 364 is located within the tubular portion 358 of the flange element 350. In an embodiment, a body portion 366 of the cable gland 364 is located within the chamber 369 of the flange element 350. In an embodiment, a connector 371 includes a first end 373 and a second end 375 opposite the first end 373. In an embodiment, a coupler 377 couples the first end 373 of the connector 371 with the second end 370 of the cable gland 364. In an embodiment, the coupler 377 includes internal threads that threadedly engage external threads of the cable gland 364. In an embodiment, a conduit 374 includes a first end 379 and a second end 381 opposite the first end 379. In an embodiment, the first end 379 of the conduit 374 is attached to the second end 375 of the connector 371. In an embodiment, a second connector 383 is connected to the second end 381 of the conduit 374. In an embodiment, the conduit 374 is a flexible conduit.

In an embodiment, the channel 304 and aperture 340 of the passthrough 310 are sized and shaped to receive a first end 385 of the at least one cable 387. In an embodiment, the at least one cable 387 extends through the conduit 374 and a second end 389 of the at least one cable 387 extends from the second end 381 of the conduit 374. In an embodiment, each of the first end 385 and the second end 389 of the at least one cable 387 includes an electrical connector 391. In an embodiment, the cable gland 364 secures the first end 385 of the at least one cable 387. In an embodiment, the at least one cable 387 includes a pair of the cables 387. In another embodiment, the at least one cable 387 includes four of the cables 387. In other embodiments, the at least one cable 387 includes any number of the cables 387.

Figure 17:
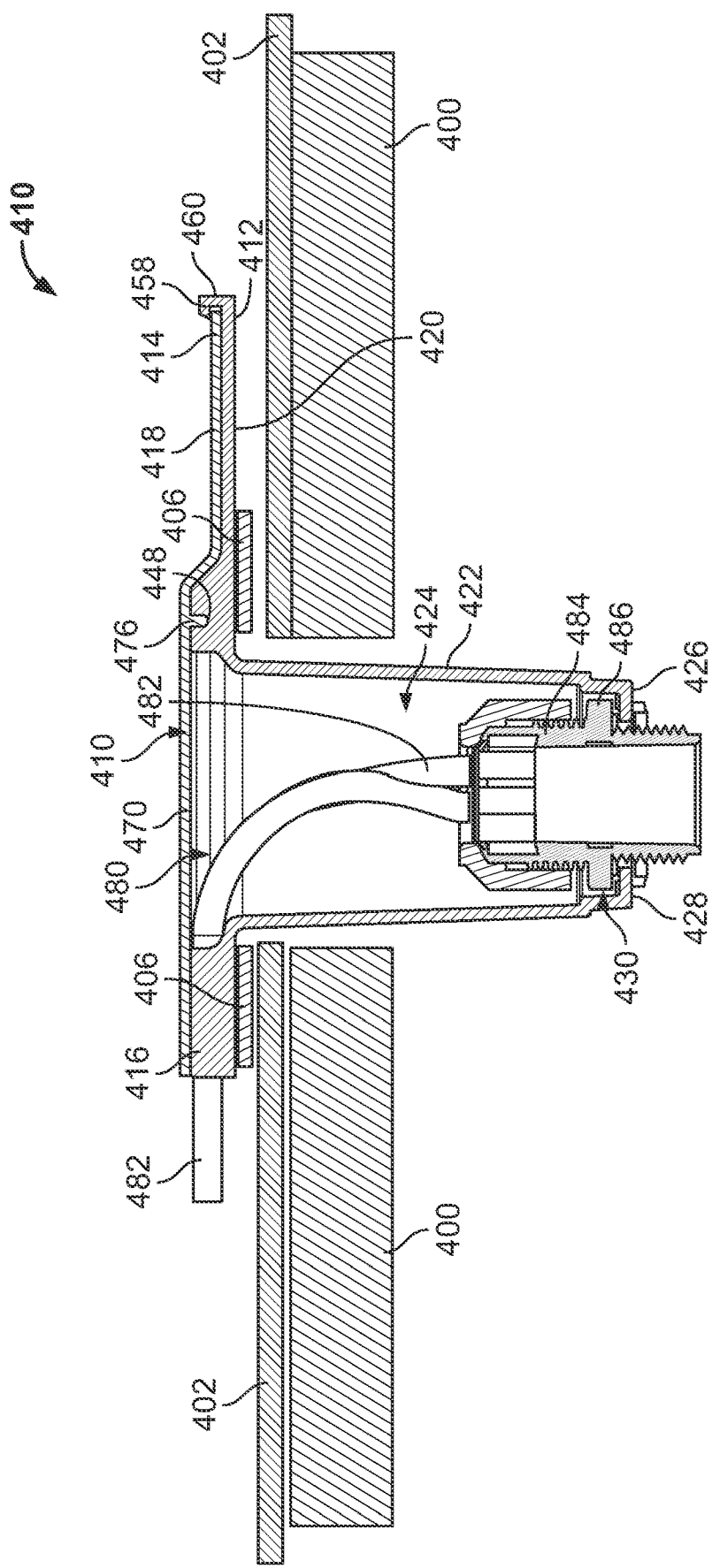
FIG. 17 shows a side cross-sectional view of the electrical cable passthrough shown in FIGS. 15 and 16.

Referring to FIGS. 15 through 17, in an embodiment, an electrical cable passthrough 410 includes a base 412 and a cover 414 attached removably to the base 412. In an embodiment, the base 412 includes a plate 416 having first surface 418, a second surface 420 opposite the first surface 418, and a tubular portion 422 extending outwardly from the second surface 420. In an embodiment, the tubular portion 422 is integral with the plate 416. In an embodiment, an aperture 424 extends through the tubular portion 422 from the first surface 418 of the plate 416 to an end 426 of the tubular portion 422. In an embodiment, the tubular portion 422 includes a tip 428 having a chamber 430.

In an embodiment, a sidewall 432 extends from the first surface 418 of the plate 416. In an embodiment, the sidewall 432 partially surrounds the aperture 424. In an embodiment, the sidewall 432 extends from a first end 434 located at a first side 436 of the plate 416, around the aperture 424, and to a second end 438 located at the first side 436 of the plate 416. In an embodiment, the first end 434 is spaced apart from the second end 438. In an embodiment, the sidewall 432 is U-shaped. In an embodiment, the sidewall 432 includes a first leg 440 that extends from the first end 434 and is proximate to one side of the aperture 424, a second leg 442 that extends from the second end 438 and is proximate to an opposite side of the aperture 424, and a curved portion 444 concentric with the aperture 424 and joining the first leg 440 and second leg 442. In an embodiment, the sidewall 432 includes an outer edge 446. In an embodiment, the outer edge 446 is oblique relative to the first surface 418 of the plate 416. In an embodiment, a channel 448 is formed within the sidewall 432. In an embodiment, the channel 448 extends from a first end 450 located at the first side 436 and a second end 452 located at the first side 436. In an embodiment, a cross-section of the channel 448 is semicircular in shape. In other embodiments, the cross-section of the channel 448 includes other shapes, e.g., square, triangular, rectangular.

In an embodiment, at least one cable channel 454 extends from the first side 436 to the aperture 424. In an embodiment, the at least one cable channel 454 includes a plurality of channels 454. In an embodiment, the plurality of cable channels 454 includes two of the cable channels 454. In another embodiment, the plurality of cable channels 454 includes four of the cable channels 454. In other embodiments, the at least one cable channel 454 includes any number of the cable channels 454. In an embodiment, a cross-section of the at least one cable channel 454 is semi-circular in shape. In other embodiments, the cross-section of the at least one cable channel 454 includes other shapes, e.g., square, triangular, rectangular.

In an embodiment, the plate 416 includes at least one slot 456 located at the first side 436. In an embodiment, the at least one slot 456 includes a plurality of slots 456. In an embodiment, the plate 416 includes at least one tab 458 located at a second side 460. In an embodiment, the at least one tab 458 includes a plurality of tabs 458.

In an embodiment, the base 412 is made from plastic. In an embodiment, the base 412 is made from polypropylene. In an embodiment, the base 412 is made from a polymer blend with polypropylene as a base resin. In another embodiment, the base 412 is made from thermoplastic polyolefin (TPO). In another embodiment, the TPO is a modified TPO including fiberglass and/or other filler material. In another embodiment, the base 412 is made from metal. In an embodiment, the base 412 is made of aluminum. In another embodiment, the base 412 is made of stainless steel.

Still referring to FIGS. 15 through 17, in an embodiment, the cover 414 includes a first surface 462 and a second surface 464 opposite the first surface 462, a first edge 466 and a second edge 468 opposite the first edge 466. In an embodiment, the cover 414 includes a raised portion 470 extending from the first surface 462 and having an opening 472 located in the first edge 466. In an embodiment, the raised portion 470 includes a sidewall 474. In an embodiment, the sidewall 474 is oblique relative to the first surface 462. In an embodiment, the raised portion 470 is U-shaped. In an embodiment, the raised portion 470 includes a tab 476 extending outwardly from the second surface 464. In an embodiment, the raised portion 470 is sized and shaped to overlay the sidewall 432 of the base 412. In an embodiment, the sidewall 474 of the raised portion 470 of the cover 414 is sized and shaped to overlay the edge 446 of the sidewall 432 of the base 412. In an embodiment, the channel 448 of the base 412 is sized and shaped to receive the tab 476 of the raised portion 470 of the cover 414. In an embodiment, the raised portion 470 covers the aperture 424.

In an embodiment, the cover 414 includes at least one tab 478 formed within the first edge 466 thereof. In an embodiment, the at least one slot 456 of the base 412 is sized and shaped to receive the at least one tab 478 to removably maintain the cover 414 on the base 412. In an embodiment, the at least one tab 478 includes a plurality of the tabs 478. In an embodiment, each of the plurality of slots 456 is sized and shaped to receive a corresponding one of the plurality of tabs 478. In an embodiment, the tab 458 of the base 412 is sized and shaped to receive the second edge 468 of the cover 414 to removably maintain the cover 414 on the base 412.

In an embodiment, the cover 414 is made from plastic. In an embodiment, the cover 414 is made from polypropylene. In an embodiment, the cover 414 is made from a polymer blend with polypropylene as a base resin. In another embodiment, the cover 414 is made from thermoplastic polyolefin (TPO). In another embodiment, the TPO is a modified TPO including fiberglass and/or other filler material. In another embodiment, the cover 414 is made from metal. In an embodiment, the cover 414 is made of aluminum. In another embodiment, the cover 414 is made of stainless steel.

In an embodiment, the cover 414 and the base 412 form an interior portion 480. In an embodiment, the interior portion 480 is sized and shaped to receive at least one cable 482. In an embodiment, the at least one cable channel 454 is sized and shaped to receive a first end of the at least one cable 482. In an embodiment, each of the plurality of the cable channels 454 is sized and shaped to receive a corresponding one of the plurality of the cables 482. In an embodiment, a cable gland 484 receives the at least one cable 482. In an embodiment, the cable gland 484 is positioned within the tubular portion 422. In an embodiment, a body portion 486 of the cable gland 484 is located within the chamber 430 of the tubular portion 422.

In an embodiment, the electrical cable passthrough 410 is installed on a roof deck 400. In an embodiment, an underlayment layer 402 overlays the roof deck 400. In an embodiment, the electrical cable passthrough 410 is installed on the underlayment layer 402. In an embodiment, a sealant 406 is applied intermediate the underlayment layer 402 and the base 412 of the electrical cable passthrough 410. In an embodiment, the sealant 406 includes butyl, silicone, rubber, epoxy, latex, neoprene, or polyurethane foam.

Figure 18:
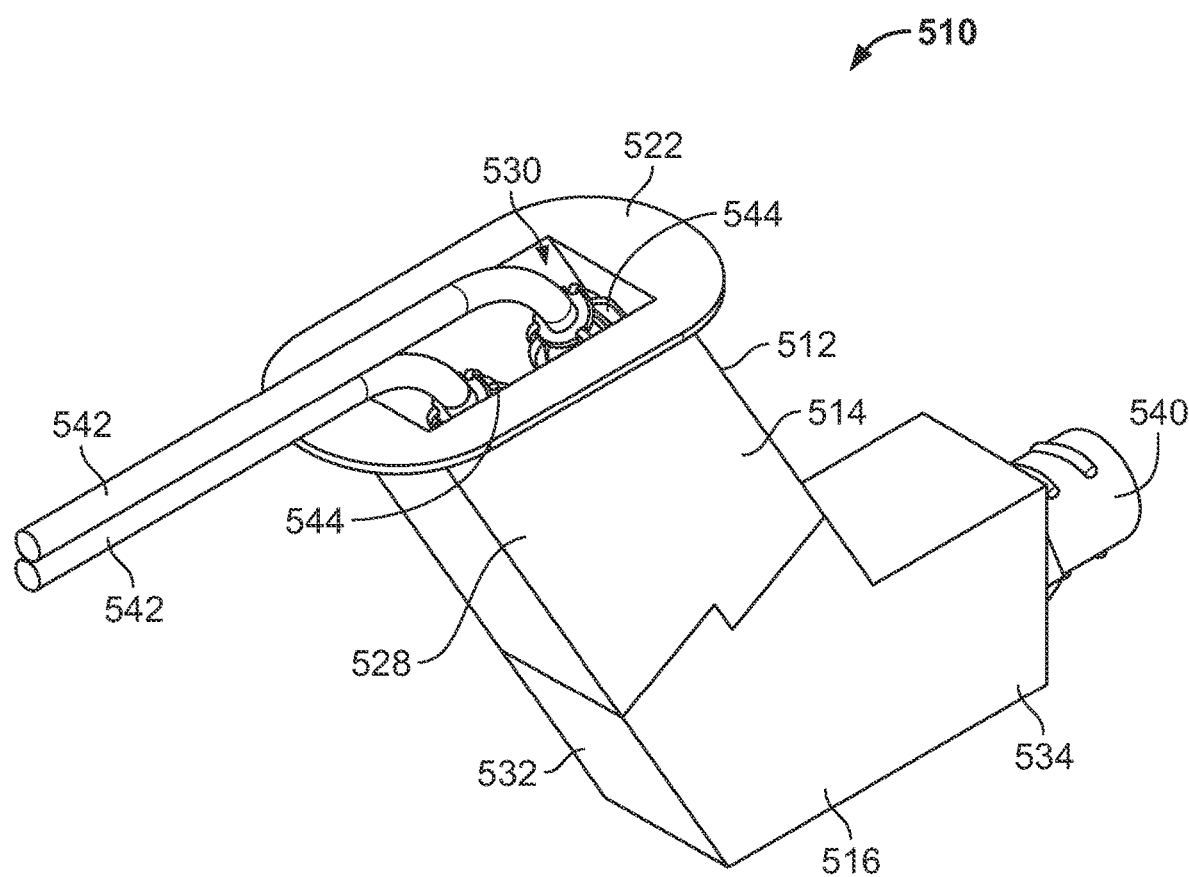
FIGS. 18 and 19 show a perspective view and an exploded perspective view, respectively, of an embodiment of insert of an electrical cable passthrough.
Figure 19:
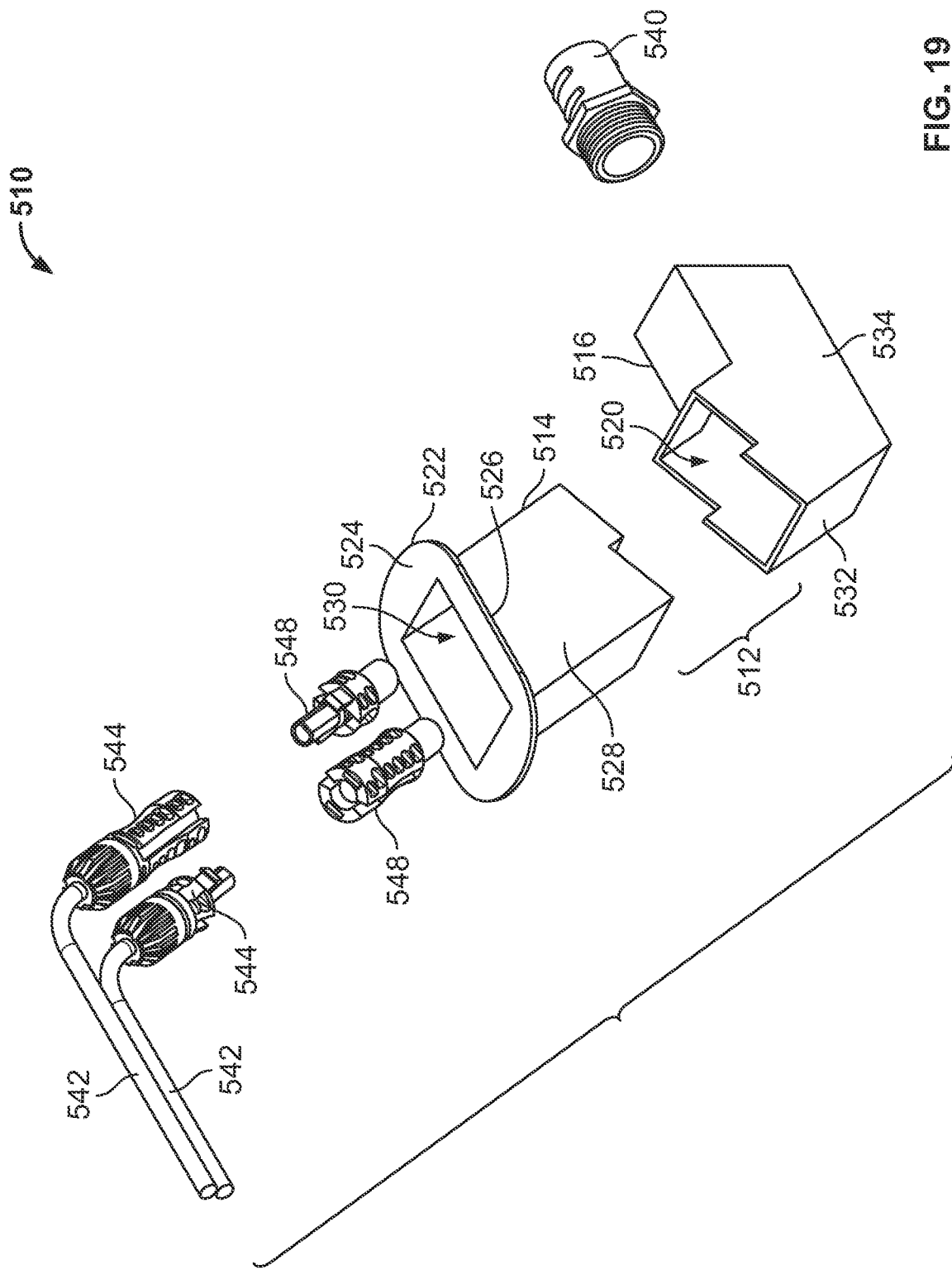
Figure 20:
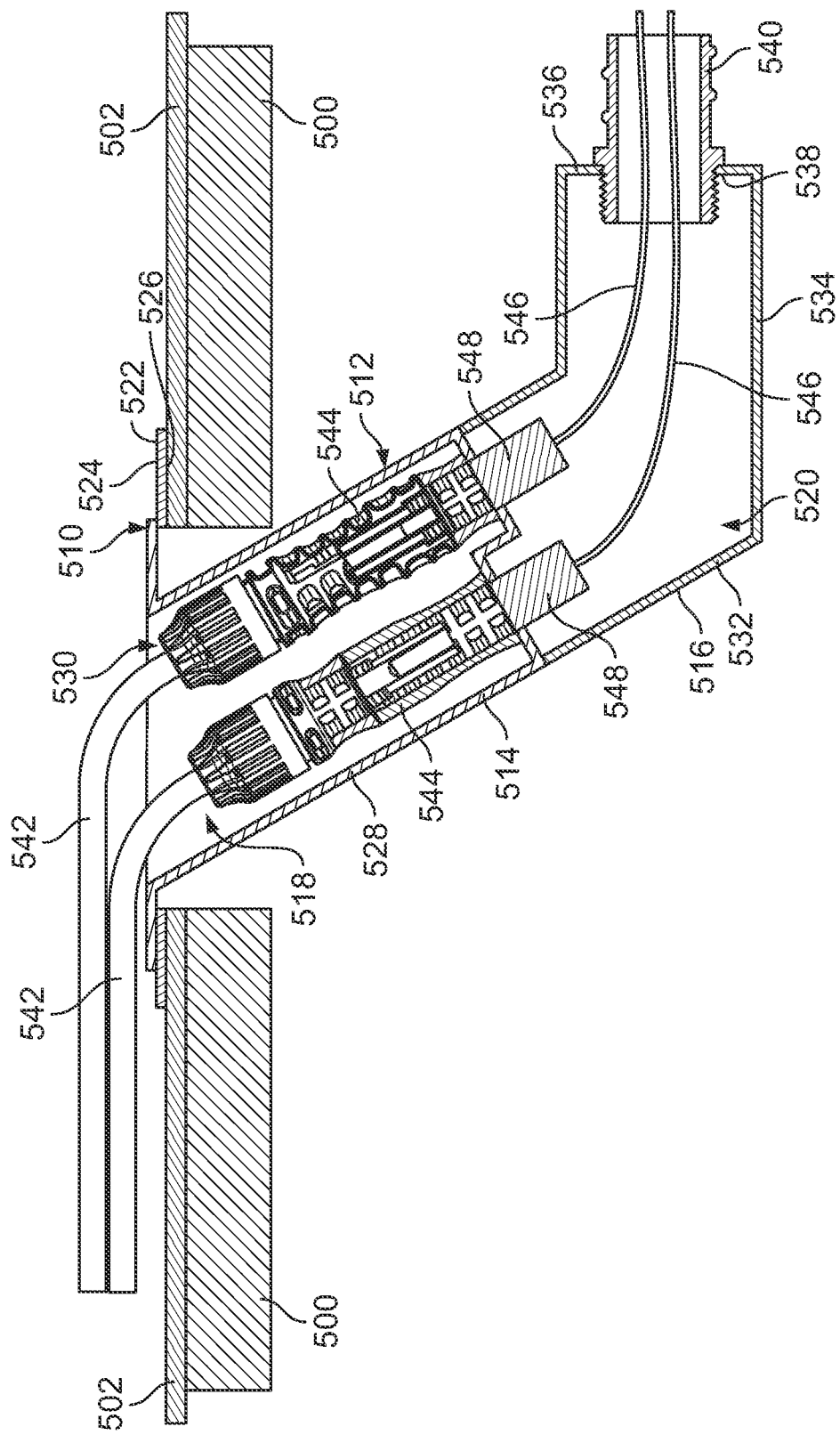
FIG. 20 shows a side cross-sectional view of an electrical cable passthrough including the insert shown in FIGS. 18 and 19.

Referring to FIGS. 18 through 20, in an embodiment, an electrical cable passthrough 510 includes a body portion 512 having a first section 514 and a second section 516 removably connected to the first section 514. In an embodiment, the first section 514 is hollow and includes an interior portion 518. In an embodiment, the second section 516 is hollow and includes an interior portion 520.

In an embodiment, the first section 514 includes a base 522 having a first surface 524 and a second surface 526 opposite the first surface 524 and a tubular portion 528 extending from the second surface 526. In an embodiment, the base 522 includes an aperture 530 extending from the first surface 524 to the interior portion 518 of the tubular portion 528. In an embodiment, the aperture 530 is square in shape. In an embodiment, the aperture 530 is circular in shape. In another embodiment, the aperture 530 is rectangular in shape. In an embodiment, the tubular portion 528 includes a square cross-section. In another embodiment, the tubular portion 528 includes a circular cross-section. In another embodiment, the tubular portion 528 includes a rectangular cross-section. In an embodiment, the tubular portion 528 extends obliquely relative to the base 522.

In an embodiment, the tubular portion 528 extends 30 degrees to 90 degrees relative to the base 522. In another embodiment, the tubular portion 528 extends 30 degrees to 80 degrees relative to the base 522. In another embodiment, the tubular portion 528 extends 30 degrees to 70 degrees relative to the base 522. In another embodiment, the tubular portion 528 extends 30 degrees to 60 degrees relative to the base 522. In another embodiment, the tubular portion 528 extends 30 degrees to 50 degrees relative to the base 522. In another embodiment, the tubular portion 528 extends 30 degrees to 40 degrees relative to the base 522.

In an embodiment, the tubular portion 528 extends 40 degrees to 90 degrees relative to the base 522. In another embodiment, the tubular portion 528 extends 40 degrees to 80 degrees relative to the base 522. In another embodiment, the tubular portion 528 extends 40 degrees to 70 degrees relative to the base 522. In another embodiment, the tubular portion 528 extends 40 degrees to 60 degrees relative to the base 522. In another embodiment, the tubular portion 528 extends 40 degrees to 50 degrees relative to the base 522. In an embodiment, the tubular portion 528 extends 50 degrees to 90 degrees relative to the base 522. In another embodiment, the tubular portion 528 extends 50 degrees to 80 degrees relative to the base 522. In another embodiment, the tubular portion 528 extends 50 degrees to 70 degrees relative to the base 522. In another embodiment, the tubular portion 528 extends 50 degrees to 60 degrees relative to the base 522.

In an embodiment, the tubular portion 528 extends 60 degrees to 90 degrees relative to the base 522. In another embodiment, the tubular portion 528 extends 60 degrees to 80 degrees relative to the base 522. In another embodiment, the tubular portion 528 extends 60 degrees to 70 degrees relative to the base 522. In an embodiment, the tubular portion 528 extends 70 degrees to 90 degrees relative to the base 522. In another embodiment, the tubular portion 528 extends 70 degrees to 80 degrees relative to the base 522. In an embodiment, the tubular portion 528 extends 80 degrees to 90 degrees relative to the base 522.

In an embodiment, the second section 516 includes a first portion 532 and a second portion 534. In an embodiment, the first portion 532 extends obliquely relative to the second portion 534. In an embodiment, the first portion 532 extends 90 degrees to 120 degrees relative to the second portion 534. In another embodiment, the first portion 532 extends 90 degrees to 110 degrees relative to the second portion 534. In another embodiment, the first portion 532 extends 90 degrees to 100 degrees relative to the second portion 534. In an embodiment, the first portion 532 extends 100 degrees to 120 degrees relative to the second portion 534. In another embodiment, the first portion 532 extends 100 degrees to 110 degrees relative to the second portion 534. In an embodiment, the first portion 532 extends 110 degrees to 120 degrees relative to the second portion 534.

In an embodiment, the first section 514 is connected to the second section 516 by snap fitting. In another embodiment, the first section 514 is connected to the second section 516 by fasteners, such as screws, bolts, or rivets. In another embodiment, the first section 514 is connected to the second section 516 by an adhesive. In another embodiment, the first section 514 and the second section 516 are integral.

In an embodiment, the second portion 534 of the second section 516 includes an end wall 536 having an aperture 538. In an embodiment, the aperture 538 is sized and shaped to receive a fitting 540. In an embodiment, the fitting 540 is sized and shaped to receive a conduit.

In an embodiment, the electrical cable passthrough 510 is configured to be installed on a roof deck 500. In an embodiment, an underlayment layer 502 overlays the roof deck 500. In an embodiment, the base 522 overlays the underlayment layer 502. In an embodiment, the second portion 534 of the second section 516 is parallel to the roof deck 500. In an embodiment, the second portion 534 of the second section 516 is substantially parallel to the roof deck 500. In an embodiment, a sealant is applied intermediate the underlayment layer 502 and the base 512 of the electrical cable passthrough 510. In an embodiment, the sealant includes butyl, silicone, rubber, epoxy, latex, neoprene, or polyurethane foam.

In an embodiment, the interior portion 518 of the first section 514 is sized and shaped to receive at least one cable 542. In an embodiment, the at least one cable 542 extends from the aperture 530. In an embodiment, the at least one cable 542 includes a first electrical connector 544. In an embodiment, the interior portion 520 of the second section 516 is sized and shaped to receive at least one wire 546. In an embodiment, the at least one wire 546 includes a second electrical connector 548. In an embodiment, the at least one wire 546 extends through the fitting 540. In an embodiment, the first electrical connector 544 is removably connected to the second electrical connector 548. In an embodiment, the connected first electrical connector 544 and second electrical connector 548 reside within one or both of the first and second sections 514, 516. In an embodiment, the first electrical connector 544 is connected directly from a jumper module, jumper cable, or a module lead. In an embodiment, the second electrical connector 548 is a bulkhead (i.e., panel mount) connector. In an embodiment, the at least one cable 542 includes a plurality of the cables 542. In an embodiment, the at least one wire 546 includes a plurality of the wires 546.

Figure 22:
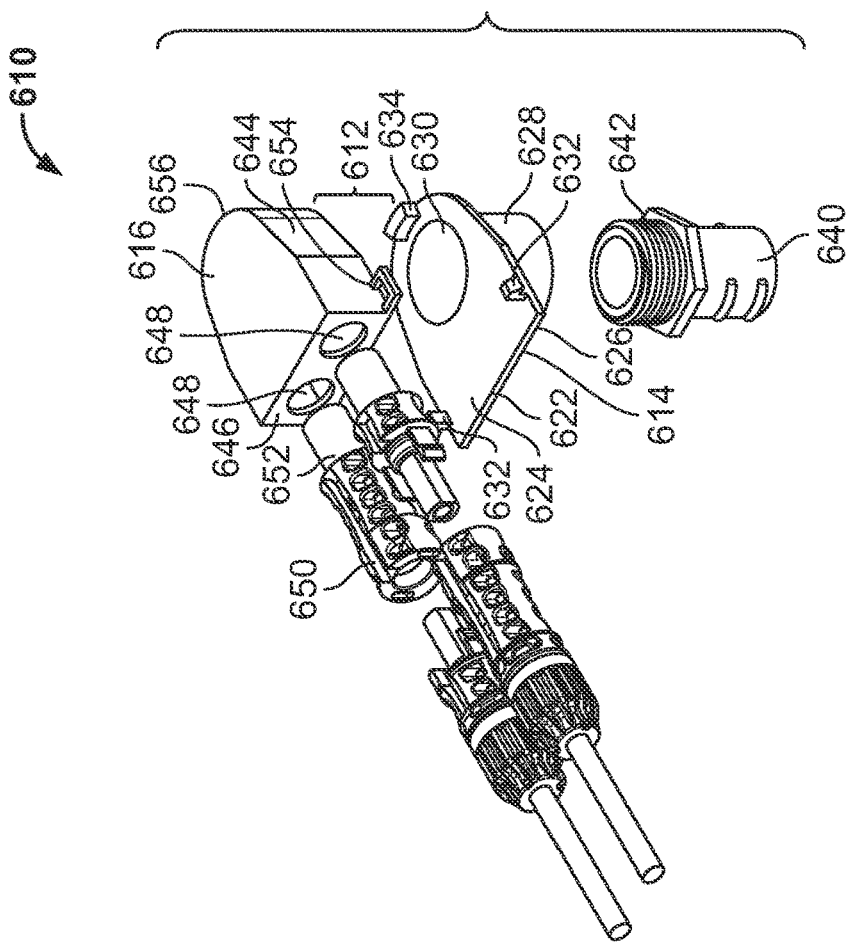
FIGS. 21 and 22 show a perspective view and an exploded perspective view, respectively, of an embodiment of insert of an electrical cable passthrough.
Figure 21:
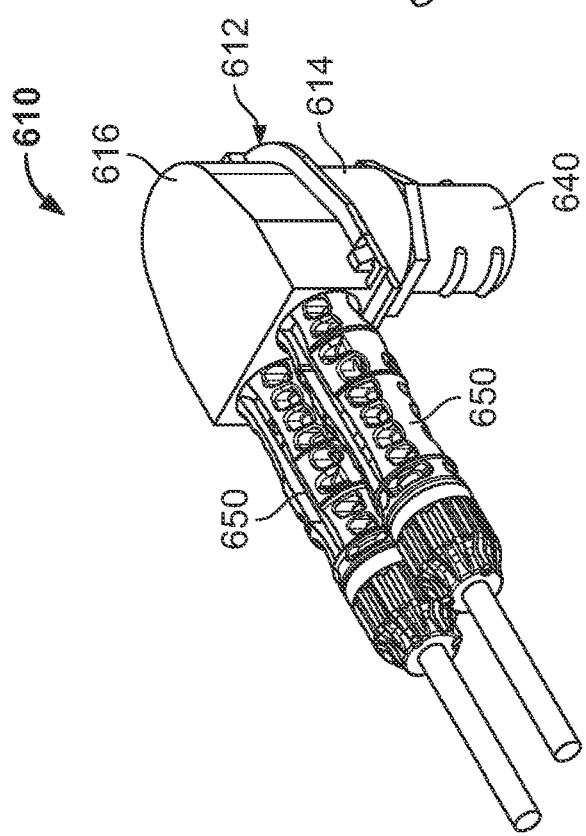
Figure 23:
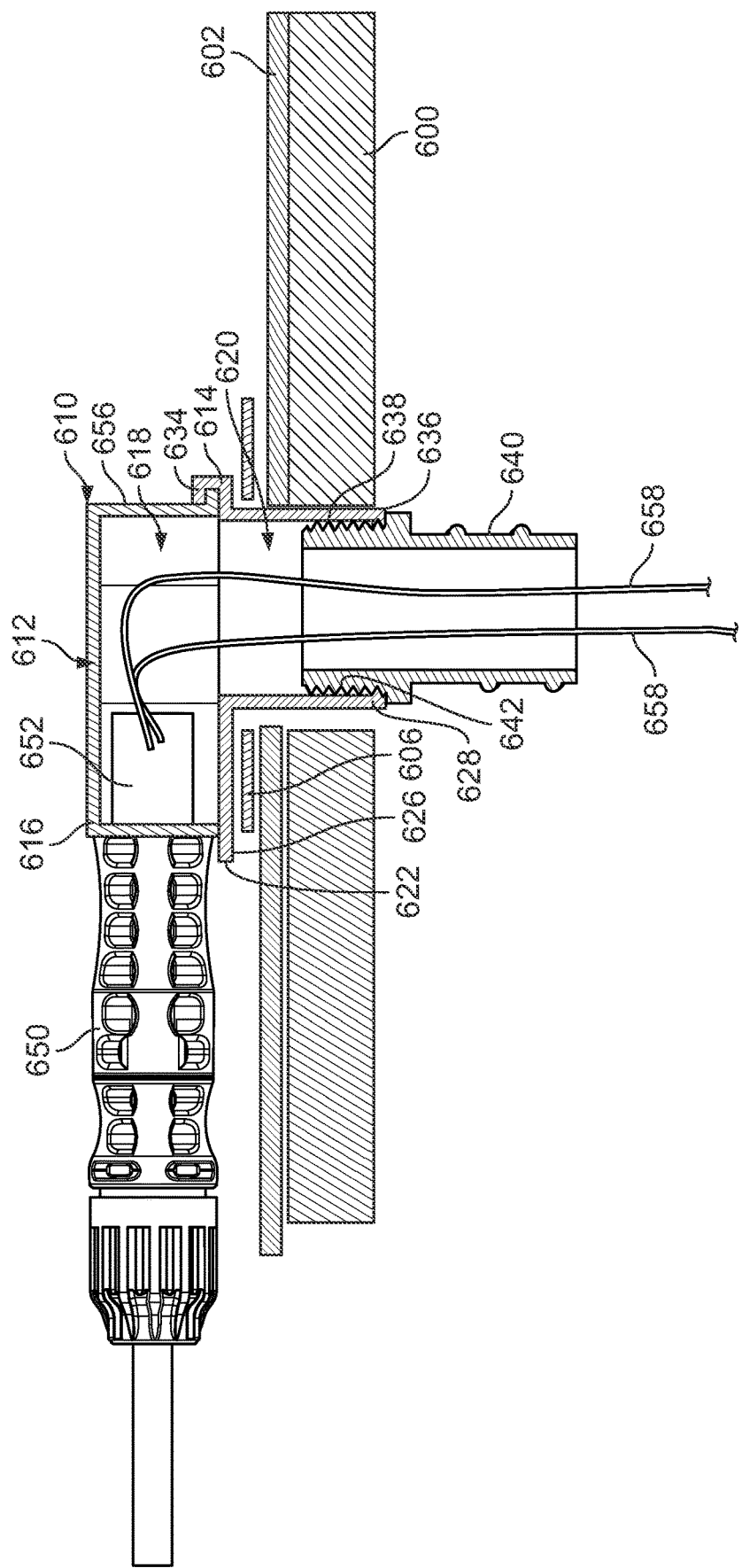
FIG. 23 shows a side cross-sectional view of an electrical cable passthrough including the insert shown in FIGS. 21 and 22.

Referring to FIGS. 21 through 23, in an embodiment, an electrical cable passthrough 610 includes a includes a body portion 612 having a first section 614 and a second section 616 removably connected to the first section 614. In an embodiment, the first section 614 is hollow and includes an interior portion 618. In an embodiment, the second section 616 is hollow and includes an interior portion 620.

In an embodiment, the first section 614 includes a base 622 having a first surface 624 and a second surface 626 opposite the first surface 624, a tubular portion 628 extending from the second surface 626, and an aperture 630 extending from the first surface 624 to the tubular portion 628. In an embodiment, at least one snap tab 632 extends from the first surface 624. In an embodiment, the at least one snap tab 632 includes a plurality of snap tabs 632. In an embodiment, at least one guide tab 634 extends from the first surface 624. In an embodiment, the base 622 includes an oblong shape. In another embodiment, the base 622 includes a circular shape. In another embodiment, the base 622 includes a rectangular shape. In another embodiment, the base 622 includes a square shape. In another embodiment, the base 622 includes a polyagonal shape.

In an embodiment, one end 636 of the tubular portion 628 includes internal threads 638. In an embodiment, the tubular portion 628 is sized and shaped to receive a conduit fitting 640. In an embodiment, external threads 642 of the conduit fitting threadedly engage the internal threads 638 of the tubular portion 628.

In an embodiment, the first section 614 is made from plastic. In an embodiment, the first section 614 is made from polypropylene. In an embodiment, the first section 614 is made from a polymer blend with polypropylene as a base resin. In another embodiment, the first section 614 is made from thermoplastic polyolefin (TPO). In another embodiment, the TPO is a modified TPO including fiberglass and/or other filler material. In another embodiment, the first section 614 is made from metal. In another embodiment, the first section 614 is made of aluminum. In another embodiment, the first section 614 is made of stainless steel.

In an embodiment, the second section 616 includes a sidewall 644 having a first end 646. In an embodiment, the first end 646 of the sidewall 644 includes at least one aperture 648 formed therein. In an embodiment, the at least one aperture 648 is circular in shape. In an embodiment, the at least one aperture 648 is square in shape. In an embodiment, the at least one aperture 648 includes a plurality of the apertures 648. In an embodiment, the at least one aperture 648 is sized and shaped to receive a corresponding one of an at least one electrical connector 650. In an embodiment, one end 652 of the at least one electrical connector 650 is inserted through the at least one aperture 648 and resides within the interior portion 620 of the second section 616. In an embodiment, the at least one electrical connector 650 is a bulkhead (i.e., panel mount) connector. In an embodiment, the at least one electrical connector 650 is electrically connected to jumper modules, jumper cables, or module leads.

In an embodiment, the second section 616 includes at least one slot 654 that is sized and shaped to receive a corresponding one of the at least one tab 632 of the base 622. In an embodiment, an end 656 of the second section 616 is aligned with the guide tab 634 of the base 622 of the first section 614 when the second section 616 is attached to the base 622.

In an embodiment, the electrical cable passthrough 610 is installed on a roof deck 600. In an embodiment, an underlayment layer 602 overlays the roof deck 600. In an embodiment, the electrical cable passthrough 610 is installed on the underlayment layer 602. In an embodiment, a sealant 606 is applied intermediate the underlayment layer 602 and the second section 616 of the electrical cable passthrough 610. In an embodiment, the sealant 606 includes butyl, silicone, rubber, epoxy, latex, neoprene, or polyurethane foam.

In an embodiment, the interior portions 618, 620 are sized and shaped to receive at least one electrical wire 658. In an embodiment, at least one electrical wire 658 is connected to the end 652 of a corresponding one of the at least one electrical connector 650. In an embodiment, the at least one electrical wire 658 extends though the first and second sections 614, 616 and the conduit fitting 640. In an embodiment, the at least one electrical wire 658 is a THEN stranded wire. In an embodiment, the at least one electrical wire 658 is a XHHW stranded wire. In an embodiment, the at least one electrical wire 658 includes a plurality of the electrical wires 658.

The embodiments described herein are merely exemplary and that a person skilled in the art may make many variations and modifications without departing from the spirit and scope of the invention. All such variations and modifications are intended to be included within the scope of the invention.

What is claimed is:

1. A system, comprising:
a passthrough including
a first section having
a first edge,
a first end,
a second end opposite the first end,
a first surface extending from the first end to the second end, and
a tubular member extending from the first surface,
a second section overlapping the first section,
the second section including a first edge substantially aligned with the first edge of the first section,
wherein the second section is removably attached to the first section, and
a sidewall extending between the first section and the second section,
wherein the passthrough is configured to be installed on a roof deck,
wherein the first surface is juxtaposed with and substantially parallel to the roof deck, and
wherein the tubular member of the first section of the passthrough is configured to align with an aperture formed within the roof deck; and
at least one cable having a first end and a second end opposite the first end,
wherein the tubular member of the first section of the passthrough is sized and shaped to receive the first end of the at least one cable,
wherein the second end of the at least one cable extends outwardly from the first edge of the first section and the first edge of the second section of the passthrough.

2. The system of claim 1, wherein the first section includes a second edge opposite the first edge of the first section, and the second section includes a second edge opposite the first edge of the second section, and wherein the second edge of the first section is substantially aligned with the second edge of the second section.

3. The system of claim 2, wherein the first section includes a third edge extending between the first edge of the first section and the second edge of the first section, and the second section includes a third edge extending between the first edge of the second section and the second edge of the second section, and wherein the third edge of the first section is substantially aligned with the third edge of the second section.

4. The system of claim 3, wherein the first section includes a fourth edge extending between the first edge of the first section and the second edge of the first section, and the second section includes a fourth edge extending between the first edge of the second section and the second edge of the second section, and wherein the fourth edge of the first section is substantially aligned with the fourth edge of the second section.

5. The system of claim 3, wherein the passthrough includes a pocket having a perimeter defined by an area of attachment of the second section to the first section.

6. The system of claim 1, wherein each of the first section and the second section of the passthrough is made from a polymer.

7. The system of claim 6, wherein each of the first section and the second section of the passthrough includes thermoplastic polyolefin (TPO).

8. The system of claim 5, wherein the passthrough is affixed to the roof deck by a plurality of fasteners.

9. The system of claim 8, wherein the first section of the passthrough is affixed to the roof deck by the plurality of fasteners.

10. The system of claim 1, wherein the passthrough is affixed to the roof deck by an adhesive.

11. The system of claim 1, wherein the first section includes a base plate having a base with a first surface and a second surface opposite the first surface, wherein the tubular member extends from the second surface.

12. The system of claim 11, wherein the base of the base plate is configured to be positioned substantially flush with the roof deck.

13. The system of claim 12, wherein a thickness of the base of the base plate is in a range of 0.5 mm to 5 mm.

14. The system of claim 12, further comprising a cable gland installed within the tubular member.

15. The system of claim 14, wherein the cable gland includes a body having a first end and a second end opposite the first end of the body of the cable gland, and a sealing nut located at the first end of the body, wherein the sealing nut is sized and shaped to be positioned within the tubular member.

16. The system of claim 15, further comprising a raceway attached to the second end of the body of the cable gland.

17. The system of claim 15, wherein the passthrough is configured to receive the least one cable having a bend with a bend radius in a range of 10 mm to 20 mm.

18. The system of claim 15, wherein the cable gland includes a socket wherein the socket includes a first surface, a second surface opposite the first surface of the socket, at least one first receptacle within the first surface of the socket, and at least one second receptacle within the second surface of the socket and in communication with a corresponding one of the at least one first receptacle, wherein the at least one first receptacle is configured to receive a connector of the at least one cable, and the at least one second receptacle is configured to receive a connector of at least one of a second cable.

19. The system of claim 18, wherein the at least one cable includes a flat wire, and at least one of the second cable includes a round wire.

20. A cable passthrough, comprising:
a first section having a first edge
a first end,
a second end opposite the first end,
a first surface extending from the first end to the second end, and
a tubular member extending from the first surface;
a second section overlapping the first section,
the second section including a first edge substantially aligned with the first edge of the first section,
wherein the second section is removably attached to the first section; and
a sidewall extending between the first section and the second section,
wherein the cable passthrough is configured to be installed on a roof deck such that the first surface is configured to be juxtaposed with and substantially parallel to the roof deck,
and wherein the tubular member is configured to align with an aperture formed within the roof deck,
wherein the cable passthrough is configured to receive at least one cable having a first end and a second end opposite the first end,
wherein the tubular member of the first section of the cable passthrough is sized and shaped to receive the first end of the at least one cable,
wherein the second end of the at least one cable is capable of extending outwardly from the first edge of the first section and the first edge of the second section of the cable passthrough.

* * * * *